United States Patent

Noma et al.

Patent Number: 6,013,969
Date of Patent: Jan. 11, 2000

[54] PIEZOELECTRIC TRANSFORMER INVERTER

[75] Inventors: Takashi Noma, Moriyama; Yasuyuki Morishima, Kyotanabe, both of Japan

[73] Assignee: Murata Manufacturing Co., Ltd., Japan

[21] Appl. No.: 09/281,683

[22] Filed: Mar. 30, 1999

[30] Foreign Application Priority Data

Mar. 31, 1998 [JP] Japan .................................. 10-105630

[51] Int. Cl.⁷ .............................................. H01L 41/08
[52] U.S. Cl. .......................................................... 310/318
[58] Field of Search .................................. 310/316, 318; 363/16, 97, 131; 323/355

[56] References Cited

U.S. PATENT DOCUMENTS

| 5,705,877 | 1/1998 | Shimada | 310/318 |
| 5,731,652 | 3/1998 | Shimada | 310/316 |
| 5,739,622 | 4/1998 | Zaitsu | 310/316 |
| 5,859,489 | 1/1999 | Shimada | 310/318 |
| 5,886,514 | 3/1999 | Iguchi et al. | 323/299 |
| 5,894,184 | 4/1999 | Furuhashi et al. | 310/316 |

FOREIGN PATENT DOCUMENTS

| 5176530 | of 1993 | Japan . |
| 9107684 | of 1997 | Japan . |
| 9135573 | of 1997 | Japan . |
| 951681 | of 1997 | Japan . |

*Primary Examiner*—Matthew Nguyen
*Attorney, Agent, or Firm*—Ostrolenk, Faber, Gerb & Soffen, LLP

[57] ABSTRACT

A boosting drive circuit includes first and second series combinations of a coil and a transistor. The two series combination of a coil and a transistor are connected in parallel. The middle points between the coils and the transistors are connected to respective primary electrodes of a piezoelectric transformer. The transistors are alternately operated with a two-phase drive circuit. Thus, a boosting drive circuit providing for the class "semi-E" operation is formed. A driving voltage control circuit controls an average voltage applied to the input terminal of the boosting drive circuit to ensure that current on the secondary electrode side of the piezoelectric transformer is controlled at a predetermined value is provided between the input power supply and the boosting drive circuit. A driving frequency control circuit changes the driving frequency of the transistors in the boosting drive circuit in such a manner that the phase difference between an alternating voltage applied to the primary electrodes of the piezoelectric transformer and an alternating current flowing in the load is controlled at a predetermined value.

16 Claims, 20 Drawing Sheets

DRIVE CIRCUIT

PULSE GENERATOR

VOLTAGE CONTROLLING OSCILLATOR

PHASE DIFFERENCE
(VALUE DETECTED BY PHASE DETECTION CIRCUIT)

INPUT VOLTAGE TO VCO

PIEZOELECTRIC TRANSFORMER INVERTER

BACKGROUND OF THE INVENTION

1. Field of the Invention

The present invention relates to a piezoelectric transformer inverter for converting direct current to alternating current by means of a piezoelectric transformer, and more particularly, to a piezoelectric transformer inverter which can be operated at a high efficiency and in a wide input voltage range, even if the load-current variation width is large.

2. Description of the Related Art

Back lit, liquid crystal displays have been commonly used as displays for portable information processors such as note-sized personal computers and the like. A fluorescent tube such as a cold-cathode tube or the like is generally used as a light source for the back light. Such tubes require a high voltage alternating current in order to turn them on.

Most portable information processors such as a notebook-sized personal computer or the like, use both a battery and an AC adapter as a power supply. Therefore, it is necessary to provide a DC/AC inverter or the like which can convert a low voltage direct current, supplied from the input power supply, to a high voltage alternating current capable of turning on the fluorescent tube.

In recent years, piezoelectric transformer inverters equipped with piezoelectric transformers which are smaller than electromagnetic transformers have been developed for use with such fluorescent tubes. For the above-mentioned uses, the piezoelectric transformer inverters typically need to have the following performance characteristics: the current (tube current) flowing through the fluorescent tube must be variably controlled in order to condition the brightness of the liquid crystal display; the inverter can be used in a wide input voltage range from the voltage of a power cell to that of a charger; and the conversion efficiency at which the direct current is converted to the alternating current must be high in order to prolong the time-period during which the tube can be powered by the power cell.

(First Conventional Example)

Conventionally, a variety of piezoelectric transformer inverters have been disclosed to meet the above-described requirements. FIG. 1 shows the piezoelectric transformer inverter disclosed in Japanese Unexamined Patent Publication No. 5-176530. This conventional example is different from the present invention in that the piezoelectric transformer inverter is a piezoelectric transformer converter in which a high voltage alternating current generated in the piezoelectric transformer is rectified for use. However, from the viewpoint that an output from the piezoelectric transformer is controlled, the disclosed invention has substantially the same object as the present invention. In regard to a piezoelectric transformer converter 1, a piezoelectric transformer 5 is driven in such a manner that an electro-magnetic energy, supplied from an input power supply 3, is stored in an inductor 4 when a transistor 2 is turned on, and when the transistor 2 is turned off, an LC resonance is produced between the inductor 4 and the input capacitance of the piezoelectric transformer 5. FIG. 2 illustrates the on-off change of the gate voltage of the transistor 2 and the change of a driving voltage (the drain-source voltage Vds of the transistor 2) applied across the primary electrodes of the piezoelectric transformer 5, at the on-off changing. An alternating voltage, outputted from the secondary electrodes of the piezoelectric transformer 5, is rectified in a rectifying circuit 6 and applied to a load 7.

As shown in FIG. 3, the boosting ratio and the resonant frequency for of the piezoelectric transformer 5 at which the boosting ratio is maximum are changed with the ambient temperature and the resistance of the load. Therefore, for feedback control in the piezoelectric transformer converter 1, variations in the voltage to be applied to the load 7 through the piezoelectric transformer 5 is detected in a voltage variation detecting section 8, and a driving frequency for on-controlling the transistor 2 is changed in a constant-voltage control circuit section 9 whereby the output voltage from the piezoelectric transformer 5 is made constant. Thus, a constant voltage can be outputted even though the size of the load 7 is changed.

The operation of a circuit such as the piezoelectric transformer converter 1 is called class "semi-E" operation, and is widely used in the drive circuits of piezoelectric transformers. The class "semi-E" operation is disadvantageous in that even if an attempt is made to control the output current by changing the duty ratio, the practical control of the output current is difficult, since the switching loss is rapidly increased. However, the class "semi-E" operation is suitable for driving the piezoelectric transformer from the following standpoints:

(1) The piezoelectric transformer can be driven more efficiently with a sinusoidal wave than with a rectangular wave. The class "semi-E" operation, by utilizing the LC resonance between the inductor and the input capacitance of the piezoelectric transformer, produces a driving waveform which is more similar to the sinusoidal wave.

(2) By utilizing the LC resonance, the peak value of a voltage to be applied to the piezoelectric transformer can be made higher than that of the input power supply voltage. Thus, this pre-boosting function can compensate for the low boosting ratio which is a disadvantage of the piezoelectric transformer.

(3) By the class "semi-E" operation, the drain-source voltage Vds of the transistor at the moment when the transistor is turned on can be controlled to Vds=0. Thus, the switching loss of the transistor can be significantly reduced, and its efficiency is high.

However, in regard to the piezoelectric transformer converter 1, when the load is light or the input power supply voltage is high, the driving frequency is controlled by the constant-voltage control circuit section 9 to be on its higher side. This compels the use of a frequency band far from the vicinity of the resonant point at which the efficient is highest. As a result, the efficiency of the piezoelectric transformer 5 deteriorates. Further, since the driving frequency increases, the transistor 2 is turned on before the LC resonant voltage (the drain-source voltage Vds of the transistor 2) is restored to 0 V, as shown in FIG. 4. Accordingly, the switching loss is significantly increased, reducing the efficiency of the piezoelectric transformer converter 1. For this reason, the piezoelectric transformer converter 1 of this system cannot be used in fields requiring a wide input/output range.

(Second Conventional Example)

FIG. 5 shows as a second conventional example, the piezoelectric transformer inverter disclosed in Japanese Unexamined Patent Publication No. 9-107684. A piezoelectric transformer inverter 11 comprises a piezoelectric transformer 13 for applying a voltage to a fluorescent tube 12, a frequency control circuit 14 for detecting a current to be supplied from the piezoelectric transformer 13 to the fluorescent tube 12, and controlling the driving frequency for the piezoelectric transformer 13 so as to keep the detected current at a predetermined value, a boosting circuit (drive circuit) 15 for dividing the driving frequency, which is formed from a direct-current input power supply voltage VDD by the frequency control circuit 14, generating the driving voltage with the divided frequency, and applying it to the primary electrodes of the piezoelectric transformer 13, a driving voltage control circuit 16 for controlling the driving voltage, which is to be applied to the piezoelectric transformer 13, to be a predetermined average voltage even though the input power supply voltage VDD is changed, and a dimming circuit 17 for PWM (pulse width modulation) controlling an average tube current flowing the fluorescent tube 12.

In the piezoelectric transformer inverter 11, the driving frequency is controlled so that the output current is made constant, in the frequency control circuit 14 and the like. The boosting circuit 15 includes two transistors 18 and 19 and two coils 20 and 21 to have a push-pull class "semi-E" operation configuration. When the piezoelectric transformer inverter 11 is operated by the push-pull class "semi-E" operation system, the driving voltage applied across the primary electrodes of the piezoelectric transformer 13 is changed, as shown in FIG. 6, by the on-off operation of the two transistors 18 and 19 in the boosting circuit 15. Accordingly, as seen by comparing FIG. 2 with FIG. 6, the piezoelectric transformer inverter 11 of this system can produce a higher voltage across the primary electrodes and a waveform which is more similar to a sinusoidal waveform than the piezoelectric transformer inverter 1 of the first conventional example.

Furthermore, the driving voltage control circuit 16 is included in the pre-stage of the boosting circuit 15, where an average voltage to be applied to the boosting circuit 15 is so controlled that the piezoelectric transformer inverter 11 can be adapted for a wide input current range. In addition, the driving voltage control circuit 16 can be intermittently operated and stopped with a light-modulating circuit 17, and thereby, the piezoelectric transformer inverter can be adapted for a wide output current range.

Since the piezoelectric transformer inverter 11 includes the driving voltage control circuit 16, the problem that if the input voltage is high or the load is light, the driving frequency is increased (which would result in the reduction of the efficiency of the piezoelectric transformer 13) can be avoided. However, the piezoelectric transformer inverter 11 is disadvantageous in that if the boosting ratio of the piezoelectric transformer 13 is varied with changes in the ambient temperature and the like or the impedance of the load 12 is changed, the piezoelectric transformer inverter 11 is compelled to operate in a frequency band far from the resonant point where the efficiency is low.

(Third Conventional Example)

FIG. 7 shows, as a third conventional example, the piezoelectric transformer inverter, which is disclosed in Japanese Unexamined Patent Publication No. 9-51681. A piezoelectric transformer inverter 31 does not employ the class "semi-E" operation. A piezoelectric transformer 32 is driven with an ordinary push-pull drive circuit. More particularly, voltage VDD from an input power supply 33 is converted to a rectangular wave in a push-pull drive circuit (switching circuit) 36 comprising two transistors 34 and 35. The rectangular wave is further converted to a sinusoidal wave in a filter circuit 37. The sinusoidal wave voltage is applied to the primary electrodes of the piezoelectric transformer 32. The boosted voltage outputted from the secondary electrodes of the piezoelectric transformer 32 is applied to a fluorescent tube 38. On the other hand, tube current flowing in the fluorescent tube 38 is detected in a detecting circuit 39. The frequency is modulated in a V-f converting circuit 40, in correspondence to the tube current. In a drive circuit 41, the driving frequency for the push-pull drive circuit 36 is controlled in correspondence to the output from the V-f converting circuit 40 whereby a predetermined tube current can be obtained. Furthermore, in a PWM light-modulating circuit (duty-ratio changing circuit) 42, the duty ratio of the rectangular wave outputted from the drive circuit 41 is modulated in correspondence to the input power supply voltage VDD.

In regard to the piezoelectric transformer inverter 31, if the input variation is controlled only by the frequency modulation, it is necessary to change the driving frequency to a high degree. This results in the significant reduction of the efficiency. Accordingly, the piezoelectric transformer inverter 31 is so configured that the duty ratio of the PWM light-modulating circuit 42 is utilized to compensate for the variation of the input power supply voltage VDD, and the variation range which can not be coped with by the PWM light-modulating circuit 42 is compensated for by the frequency control in the V-f converting circuit 40 and the drive circuit 41.

This piezoelectric transformer inverter does not employ the class "semi-E" operation and does not exhibit high efficiency. Probably, one of the reasons lies in that in the class "semi-E" operation, the efficiency is significantly reduced if the input power to the piezoelectric transformer inverter is controlled by changing the on-duty ratio, and it is difficult to cope with a practical wide input voltage range. In other words, an ordinary push-pull drive circuit, though the switching loss is larger and the efficiency is lower, has excellent input power controlling characteristics as compared with the class "semi-E" operation. Thus, the push-pull drive circuit has the merit that it is unnecessary to provide an additional driving voltage control circuit in contrast to the second conventional example.

However, since the piezoelectric transformer inverter 31 employs the push-pull drive circuit 36 as a driving system for the piezoelectric transformer 32, the efficiency is lower than that of the class "semi-E" operation due to the switching loss. Furthermore, there are caused the following problems. When the input power supply voltage VDD is low, the duty ratio (on duty) of the voltage outputted from the drive circuit 41 to transistors 34 and 35, which constitute the push-pull drive circuit 36, is large, and the input voltage to the piezoelectric transformer 32 has a substantially sinusoidal waveform, as shown in FIG. 8A. If the power supply voltage VDD becomes high, the duty ratio of the voltage outputted from the drive circuit 41 to the transistors 34 and 35 is small, so that the high frequency component contained in the driving waveform is increased, deteriorating the efficiency of the piezoelectric transformer 32, as shown in FIG. 8B. Further, for the purpose of making the load voltage outputted from the piezoelectric transformer 32 constant, the frequency is changed. Accordingly, when the load is light, the driving frequency departs considerably from the resonant frequency of the piezoelectric transformer, reducing the efficiency, as in the first and second conventional examples.

(Fourth Conventional Example)

FIG. 9 shows a piezoelectric transformer inverter, as a fourth conventional example, which is disclosed in Japanese Unexamined Patent Publication No. 9-135573. In regard to a piezoelectric transformer inverter 51, tube current flowing through a fluorescent tube 53 is detected in a current detecting circuit 52. The amplitude of an output signal from a waveform shaping circuit 54 to a drive circuit 55 is controlled in correspondence to the value of the detected tube current, and thereby, the driving voltage to be applied to the piezoelectric transformer 56 is changed, so that the tube current to flow in the fluorescent tube 53 is kept substantially constant.

In regard to a piezoelectric transformer 56, the phase difference between the input and output voltages with respect to the piezoelectric transformer 56 is rapidly changed in the vicinity of the resonant point (for), as shown in FIG. 10. The efficiency is highest in the range from the resonant point to its slightly higher frequency side. However, the resonant frequency for of the piezoelectric transformer 56 is changed with environmental conditions such as the ambient temperature, the load, or the like, and the temperature rising caused by the driving. Therefore, a phase difference detecting circuit 57 detects the phase difference between the input and output voltages of the piezoelectric transformer 56, and a drive circuit 55 is so controlled that the phase difference is within a predetermined range, preventing the driving frequency for the piezoelectric transformer 56 from significantly departing from the resonant frequency for. In other words, the driving frequency is so controlled that the phase difference is equal to that corresponding to the vicinity to the resonant point, and thereby, the operation of the piezoelectric transformer inverter can be automatically achieved in the frequency band where the efficiency is highest, irrespective of the amount of the load.

The piezoelectric transformer inverter 51 can not control the output voltage by changing the frequency in contrast to the first and second conventional examples. As in the third conventional example, the output voltage is stabilized by changing the duty ratio of the pulse width variable circuit 59 in a pulse width control circuit 58 and a variable oscillation circuit 60. Furthermore, the frequency band in the vicinity of the resonant point where the efficiency is highest is available by detecting the phase difference in a phase difference detecting circuit 57. Thus, the piezoelectric transformer inverter 51 is more advantageous in the efficiency, as compared with the first, second, and third conventional examples.

However, since the piezoelectric transformer 51 controls the output voltage by means of the on-time duty ratio, it is practically impossible to employ the efficient class "semi-E" operation for the drive circuit 55. Only an ordinary push-pull drive circuit is available. For this reason, the drive circuit has a low efficiency as in the third conventional example.

As seen in the above description, none of the conventional piezoelectric transformer inverters, though they have advantages and disadvantages as described above, employ such a piezoelectric transformer driving system that the piezoelectric transformers can be operated in the vicinity of the resonant frequency, has a wide input/output voltage range, and is efficient comparably to the class "semi-E" operation.

SUMMARY OF THE INVENTION

In view of the above-described problems, the present invention has been devised, and it is an object of the present invention to provide a piezoelectric transformer inverter which can be operated in a wide input voltage range and in a wide output current range, and is efficient throughout its range of operation.

According to a first aspect of the present invention, there is provided a piezoelectric transformer inverter which comprises:

a piezoelectric transformer for converting an alternating voltage applied across its primary electrodes to an alternating current which is supplied to a load connected to its secondary electrode;

a boosting drive circuit made up of a first series combination of a first coil and a first switching element for applying a voltage to one of said primary electrodes of said piezoelectric transformer, a second series combination of a second coil with a second switching element for applying a voltage to another of said primary electrodes of said piezoelectric transformer, and a two-phase drive circuit for alternately driving said first and second switching elements;

a driving voltage control circuit connected between an input terminal of said series combinations and an input power supply and adapted to control an average voltage applied to said input terminal of said series combinations whereby current on a secondary electrode side of said piezoelectric transformer is maintained at a constant level; and a driving frequency control circuit which controls a driving frequency at which said first and second switching elements are driven in such a manner that the phase difference between said alternating voltage applied to said primary electrodes of said piezoelectric transformer and said alternating current flowing supplied to said load is maintained at a predetermined value.

The first and second switching elements are preferably transistors.

The piezoelectric transformer inverter in accordance with the first aspect of the present invention is provided with the driving frequency control circuit for controlling a driving frequency for controlling at a predetermined value the phase difference between an input voltage on the primary electrode side of the piezoelectric transformer and an output current on the load side of the piezoelectric transformer. Accordingly, even though the resonant frequency is changed, caused by use conditions such as differing load conditions, changes in the environmental temperature, and the like, the difference between the phases on the input and output sides of the piezoelectric transformer can be controlled to have a predetermined value, and thereby, the piezoelectric transformer can be always operated in the vicinity of the resonant frequency. Thus, the piezoelectric transformer inverter can be operated at a frequency at which the efficiency is highest even though the use conditions are changed. Preferably, the phase difference between the alternating voltage applied to the primary electrodes of the piezoelectric transformer and the alternating current flowing in the load is set at 90°±40° or 27°±45°.

The drive voltage control circuit is connected between the two series combinations and the input power supply, and controls the average voltage to be applied to the input terminal of the series combinations whereby the current on the secondary electrode side of the piezoelectric transformer is controlled at the predetermined setting. Accordingly, a wide output voltage range can be attained. For example, if a fluorescent tube is operated, the wide light-modulation range can be obtained. In addition, the included driving voltage control circuit having the above-described configuration enables the class "semi-E" configuration to be employed as the boosting drive means.

A boosting drive circuit which preferably has a class "semi-E" amplifier circuit is included which is made up of the series combination of the first coil with the first switching element for applying voltage at the intermediate (or halfway) point thereof to one of the primary electrodes of the piezoelectric transformer, the series combination of the second coil with the second switching element for applying voltage at the intermediate (or halfway) point thereof to the other of the primary electrodes of the piezoelectric transformer, and the two-phase drive circuit for driving alternately the first and the second switching element. Therefore, the switching loss of the transistors can be considerably reduced, and thereby, the efficiency of the piezoelectric transformer inverter can be enhanced.

The piezoelectric transformer inverter in accordance with the first aspect of the present invention can be operated in a wide input voltage range and in a wide output current range, and the efficiency is high all in the operation range.

Accordance to a second aspect of the present invention, there is provided a piezoelectric transformer inverter which comprises:

a piezoelectric transformer having one of its primary electrodes grounded and adapted to convert an alternating voltage applied to the other of its primary electrodes to an alternating current which is supplied to a load connected to its secondary electrode;

a boosting drive circuit containing a series combination of a coil and a switching element for applying a voltage to said other of said primary electrodes of said piezoelectric transformer;

a driving voltage control circuit connected between an input terminal of said series combination and an input power supply and adapted to control an average voltage applied to said input terminal of said series combination so that a current on said secondary electrode side of said piezoelectric transformer is maintained at a constant level; and a driving frequency control circuit which controls a driving frequency of said switching element in such a manner that a phase difference between said alternating voltage applied to said primary electrode of said piezoelectric transformer and said alternating current supplied to said load is maintained at a constant value.

The piezoelectric transformer inverter in accordance with the second aspect of the present invention has the same advantages as one in accordance with the first aspect of the present invention. The piezoelectric transformer inverter in accordance with the second aspect of the present invention, as compared with one in accordance with the first aspect of the present invention, presents a rather lower efficiency. However, for the boosting drive circuit, only one coil and one transistor are needed, which reduces costs.

Preferably, autotransformers are used as the coils of the boosting drive circuit. The primary terminals of the autotransformers are connected to the output of the drive voltage control circuit, the secondary terminals of the autotransformers are connected to the primary electrodes of the piezoelectric transformer, and the intermediate terminals of the autotransformers are connected to the transistors, respectively.

In this case, as the autotransformers are included, the driving voltage of the piezoelectric transformer can be increased. Thus, the piezoelectric transformer inverter is suitable for cases where the input power supply voltage is low, a higher output is required, and the like.

As the coils of the boosting drive circuit, the primary winding of a boosting transformer may be included with the secondary winding of the boosting transformer connected across the primary electrodes of the piezoelectric transformer. In this case, an energy, supplied from the input power supply when the switching elements are turned on, is stored in the primary winding of the boosting transformer. When the switching elements are turned off, the energy is transmitted to the secondary winding through their electromagnetic coupling, so that the energy is applied to the primary electrodes of the piezoelectric transformer.

With this arrangement, the driving voltage of the piezoelectric transformer can be also enhanced, since the boosting transformer is included. Accordingly, the piezoelectric transformer inverter is suitable for cases where the input power supply voltage is low, a higher output is required, and the like.

The driving voltage control circuit may include a switching element for turning the supply of the input power supply voltage to the boosting drive circuit on and off, and a circulation current retaining means can be provided. In this case, the switching frequency of said switching element is set to be at least double the driving frequency.

With this arrangement, the electric power per each waveform, applied to the piezoelectric transformer, can be kept constant, since the switching frequency of the drive voltage control circuit is at least double the driving voltage of the piezoelectric transformer. Accordingly, for the boosting drive circuit, transistors having low breakdown voltage characteristics are available, or, as the peak current flowing in the coils can be reduced, small-sized coils can be employed for the boosting drive circuit.

The drive voltage control circuit may include a switching element for turning the supply of the input power supply voltage to the boosting drive circuit on and off, and a circuit which causes the switching element to be operated and stopped intermittently at a period longer than that of the driving frequency of the boosting drive circuit.

With this arrangement, the average voltage applied to the load can be controlled in a wide range, since the load can be intermittently operated. For example, if a fluorescent tube is operated, a wide light-modulation range can be realized.

The drive voltage control circuit may include the switching element for switching the supply of the input power supply voltage to the boosting drive circuit on and off, a coil between the switching element and the boosting drive circuit, a circulation current retaining means and a smoothing capacitor connected to the opposite sides of the coil, respectively, and a circuit for turning the switching element on and off in correspondence to the intensity of the current flowing in the load.

With this arrangement, the input voltage to the boosting drive circuit can be stabilized, though the number of components used in the drive voltage control circuit such as the coil, and the smoothing capacitor, and the like is increased. Thus, the transistors having low breakdown voltage characteristics are available, for the boosting drive circuit, and the size of the coil can be reduced.

BRIEF DESCRIPTION OF THE DRAWINGS

For the purpose of illustrating the invention, there is shown in the drawing several forms which are presently preferred, it being understood, however, that the invention is not limited to the precise arrangements and instrumentalities shown.

DESCRIPTION OF THE PREFERRED EMBODIMENT (First Embodiment)

Figure 11:
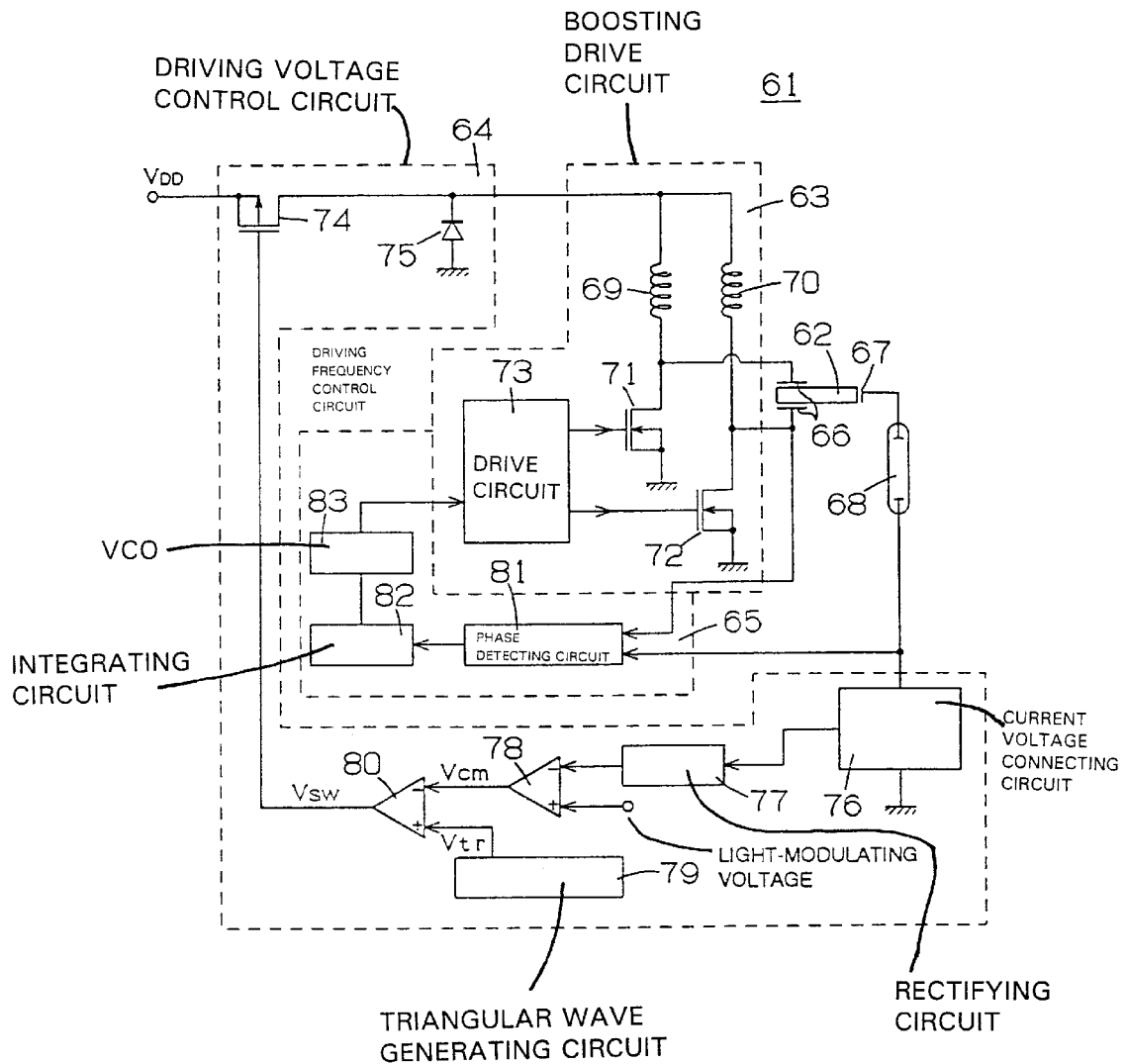
FIG. 11 is a circuit diagram of a piezoelectric transformer inverter according to a first embodiment of the present invention.

FIG. 11 is a circuit block diagram showing the configuration of a piezoelectric transformer inverter 61 according to a first embodiment of the present invention. The piezoelectric transformer inverter 61 comprises four circuit blocks: a piezoelectric transformer 62, a boosting drive circuit 63, and a driving voltage control circuit 64, and a driving frequency control circuit 65. The configuration of the piezoelectric transformer inverter 61 can be roughly divided into two parts: a driving frequency control circuit which is provided in order to operate the piezoelectric transformer 62 at a frequency where its efficiency is highest under any load and environmental condition, and a boosting drive circuit and a driving voltage control circuit which maintain the load output current at a constant target value. The configuration and operation of the piezoelectric transformer inverter 61 will be described below.

The piezoelectric transformer 62 has a boosting ratio determined by its shape, size, and piezoelectric characteristics. It operates to increase an alternating voltage applied to its primary electrodes 66 and outputs an alternating current through the secondary electrodes 67 to supply the alternating current to a fluorescent tube 68 which operates as a load. The primary electrodes 66 are connected to the output of the boosting drive circuit 63, and the secondary electrode 67 is connected to fluorescent tube 68.

The boosting drive circuit 63 applies an alternating voltage (driving voltage) having a predetermined frequency (driving frequency) to the primary electrodes 66 of the piezoelectric transformer 62 to drive the piezoelectric transformer 62 for boosting-operation. The boosting drive circuit 63 is made up of two coils 69 and 70, two transistors 71 and 72, and a two-phase drive circuit 73. The coil 69 and the transistor 71 are connected in series as are the coil 70 and the transistor 72. The series combination of the coil 69 and the transistor 71 and the series combination of the coil 70 and the transistor 72 are connected in parallel. The mid point between the coil 69 and the transistor 71 and the mid point between the coil 70 and the transistor 72 are connected to the primary electrodes 66 of the piezoelectric transformer, respectively. The transistors 71 and 72 are alternately turned on and off by the two-phase drive circuit 73. To this end, the inductances of the coils 69 and 70 are selected to resonate with the input capacitance of the piezoelectric transformer at the drive frequency.

Figure 6:
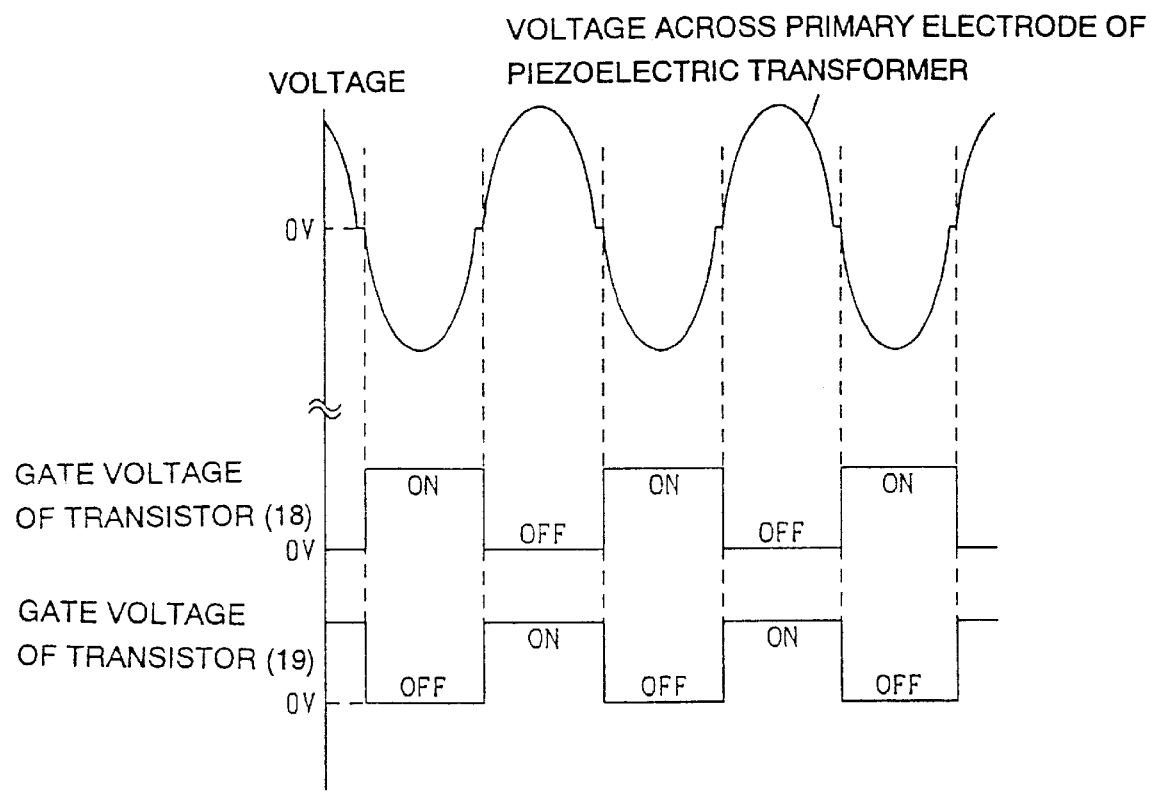
FIG. 6 is a waveform chart illustrating the relationships between the gate voltages of two transistors and an input voltage applied across the primary electrodes of a piezoelectric transformer in the second conventional piezoelectric transformer inverter.
Figure 7:
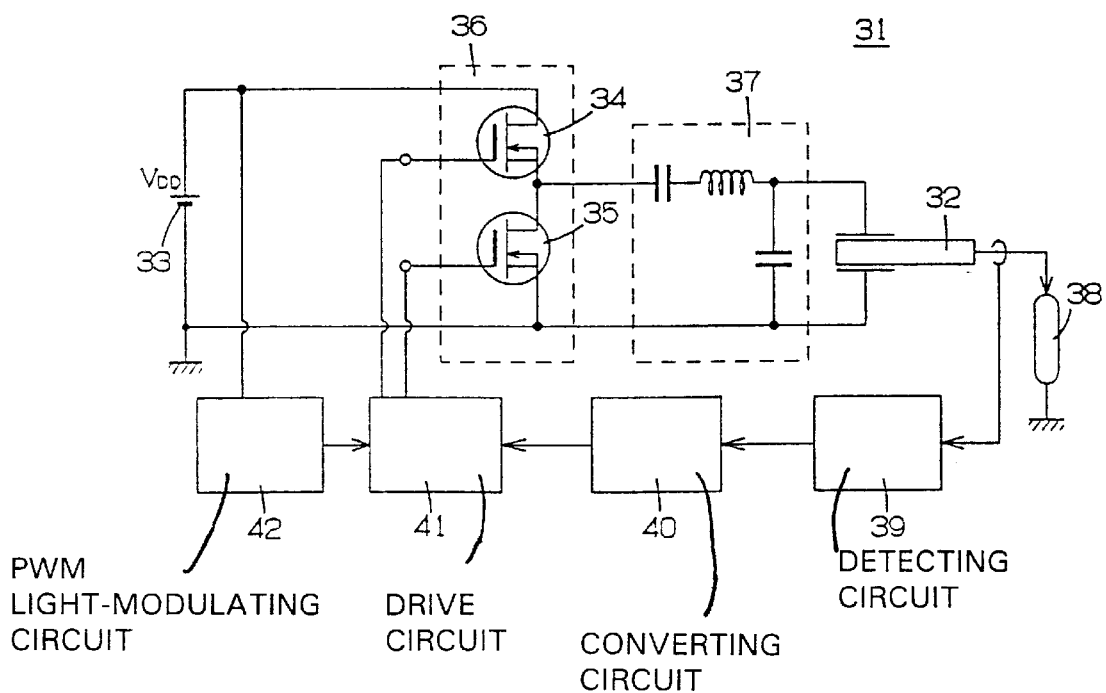
FIG. 7 is a circuit diagram of a third conventional piezoelectric transformer inverter.
Figure 8A:
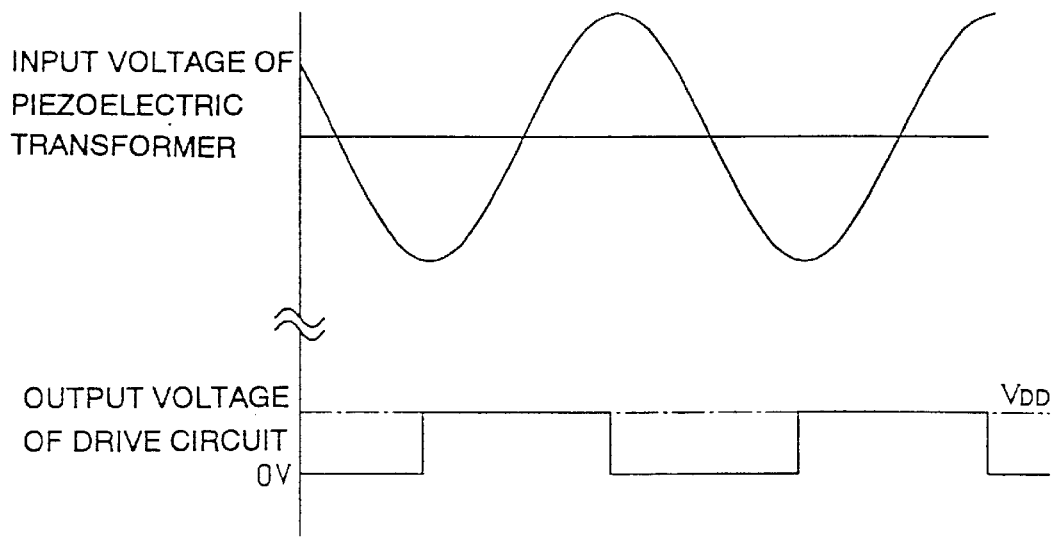
FIG. 8A is a waveform chart showing the relationships between an output voltage from a drive circuit and an input voltage to the primary electrodes of a piezoelectric transformer, when an input power supply voltage to the third conventional piezoelectric transformer inverter is low.
Figure 8B:
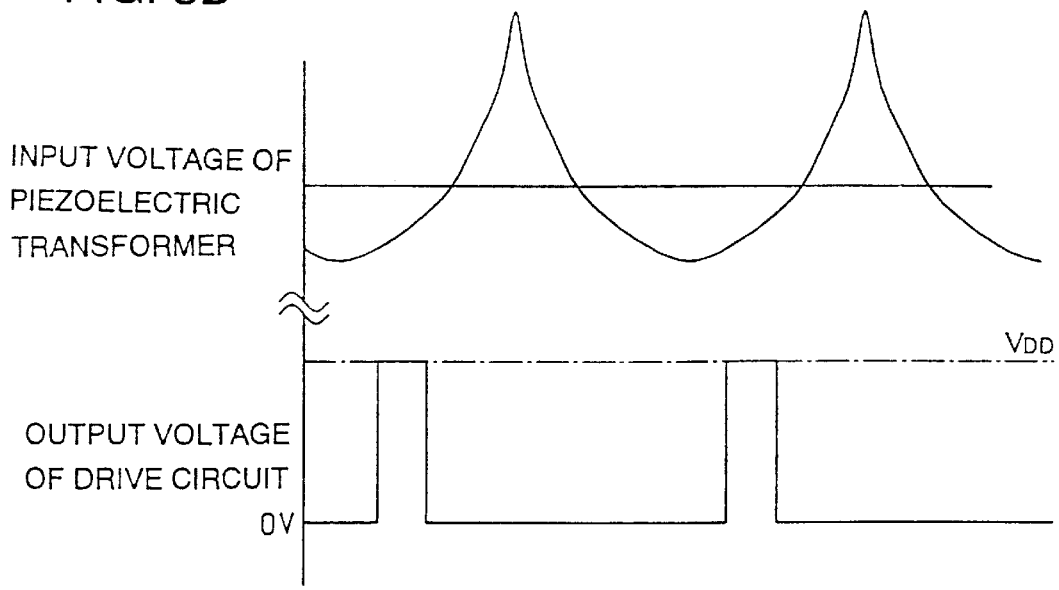
FIG. 8B is a waveform chart showing the relationships between the output voltage from the drive circuit and the input voltage to the primary electrodes of the piezoelectric transformer, when the input power supply voltage is high.
Figure 9:
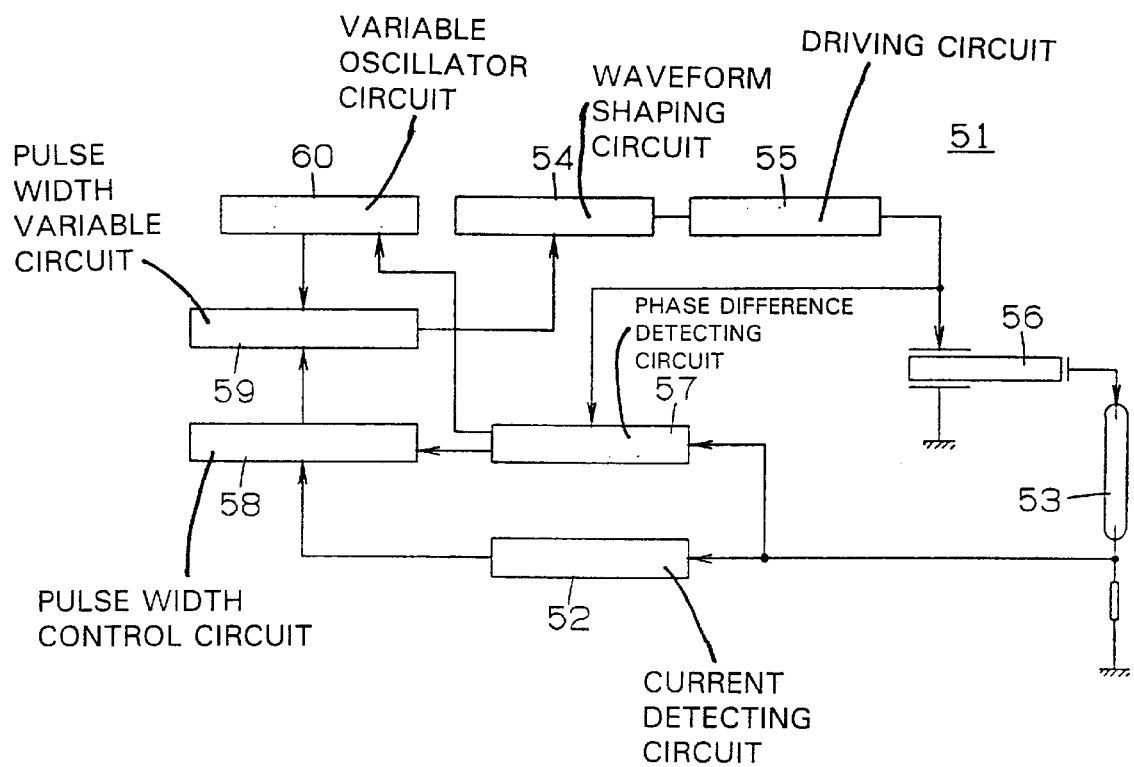
FIG. 9 is a circuit diagram of a fourth conventional piezoelectric transformer inverter.

When the transistor 71 or 72 is turned on, a current from the input power supply flows into the coil 69 or 70, respectively, and the coil is charged with electromagnetic energy. When the transistor 71 or 72 is turned off, the electromagnetic energy stored in the coil 69 or 70, respectively, is liberated, so that a voltage higher than the input power supply voltage VDD is generated. Accordingly, the two transistors 71 and 72 are controlled to be alternately turned on and off by the two-phase drive circuit 73, so that the direct current input power supply voltage VDD is converted to an alternating voltage having a waveform which is similar to that of a sinusoidal wave (see FIG. 6) and is supplied to the primary electrodes 66 of the piezoelectric transformer 62 at the desired frequency.

The driving voltage control circuit 64 is included between the input power supply and the boosting drive circuit 63 and both detects and rectifies the current flowing through the fluorescent tube 68 and controls the current to cause it to flow in the fluorescent tube 68 at a constant value. In addition, the driving voltage control circuit 64 pulse width modulates ("PWM") the input power supply voltage VDD in such a manner that the average current which flows in the fluorescent tube 68 has a constant value corresponding to a target value which is externally set as a light-modulating voltage. A switching transistor 74 is included between the input power supply and the coils 69 and 70 of the boosting drive circuit 63. A diode 75 is included between the switching transistor 74 and ground and operates as a circulating current retaining means. Alternatively, a switching component such as an N channel FET or the like may be employed to form a synchronous rectifying type.

A current voltage converting circuit 76 is connected between the fluorescent tube 68 and ground. The tube current flowing through the fluorescent tube 68 is converted to a voltage, rectified in a rectifying circuit 77, and then input to a differential amplifier 78. A signal Vcm which is proportional to the difference between the output voltage from the rectifying circuit 77 and an externally generated light-modulating voltage appears at the output of the differential amplifier 78. A comparator 80 compares the output Vcm from the differential amplifier 78 with a triangular wave (saw-tooth wave) Vtr output from a triangular wave generating circuit 79. If the triangular wave Vtr outputted from the triangular wave generating circuit 79 is higher than the output Vcm from the differential amplifier 78, the comparator 80 becomes "high". In contrast, the comparator 80 becomes "low" if the triangular wave Vtr output from the triangular wave generating circuit 79 is lower than the output Vcm from the differential amplifier 78. As a result, a rectangular pulse-shape switching voltage VSW is applied to the switching transistor 74 for on-off control of the switching transistor 74. Thus, the output voltage from the driving voltage control circuit 64 to the boosting drive circuit 63 is PWM controlled.

Figure 12:
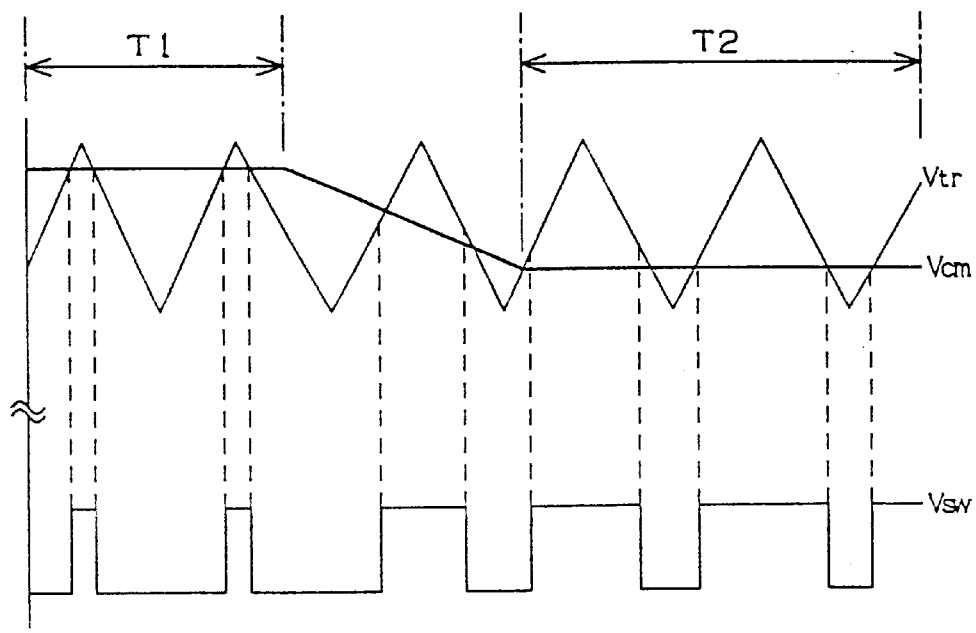
FIG. 12 includes a chart illustrating the relationships between an output from a triangular wave generation circuit and an output from a differential amplifier, and a chart of an output waveform from a comparator, generated simultaneously, in the piezoelectric transformer inverter of the first embodiment.

The operation of the driving voltage control circuit 64 will be now described in the case where the tube current flowing through the fluorescent tube is larger than the target value Vtr. As the tube current flowing through the fluorescent tube 68 increases, the output voltage from the current voltage converting circuit 76 increases. When the output voltage from the current voltage converting circuit 76 increases, the rectified output from the rectifying circuit 77 increases. When the output from the rectifying circuit 77 is increases, the inverted input to the differential amplifier 78 becomes higher than the non-inverted input voltage (light-modulating voltage), so that the output Vcm from the differential amplifier 78 is reduced. As a result, the wave form at the output of comparator 80 changes from that shown during the time-period T1 in FIG. 12 to that shown in time-period T2, so that the ratio of "high" to "low" occupying the switching voltage VSW outputted from the comparator 80 is increased, and the duty ratio is enhanced. When the duty ratio of the output from the comparator 80 is increased, the ratio of the off-time to on-time of the switching transistor 74 is enhanced, and the average output voltage from the driving voltage control circuit 64 is reduced.

When the average output voltage from the driving voltage control circuit 64 becomes low, the voltage across the primary electrodes 66 of the piezoelectric transformer 62 is reduced, and the output current from the piezoelectric transformer 62 is decreased. As a result, the tube current flowing through the fluorescent tube 68 is reduced. Thus, the tube current, which had previously increased due to a disturbance of some sort, will be lowered to approach the target value. Accordingly, even if there are disturbances caused by factors such as environmental temperature and the like, the driving voltage control circuit 64 inhibits the current flowing through the fluorescent tube 68 from varying, stabilizing the current at the target value. In addition, the target value of the tube current flowing through the fluorescent tube 68 can be controlled for the light modulation of the fluorescent tube 68 by adjusting the light-modulating voltage inputted through the non-inverted input terminal of the differential amplifier 78.

The driving frequency control circuit 65 detects the phase difference between the input voltage on the primary electrode 66 side of the piezoelectric transformer 62 and the load-current on the secondary electrode 67 side (that is, output current from the piezoelectric transformer 62), and so changes the driving frequency to ensure that the phase difference is within a predetermined range. The driving frequency control circuit 65 is made up of a phase detecting circuit 81 for detecting the phase difference between the input voltage to and the output current from the piezoelectric transformer 62, an integrating circuit 82, and a voltage control oscillator (VCO) 83.

Figure 10:
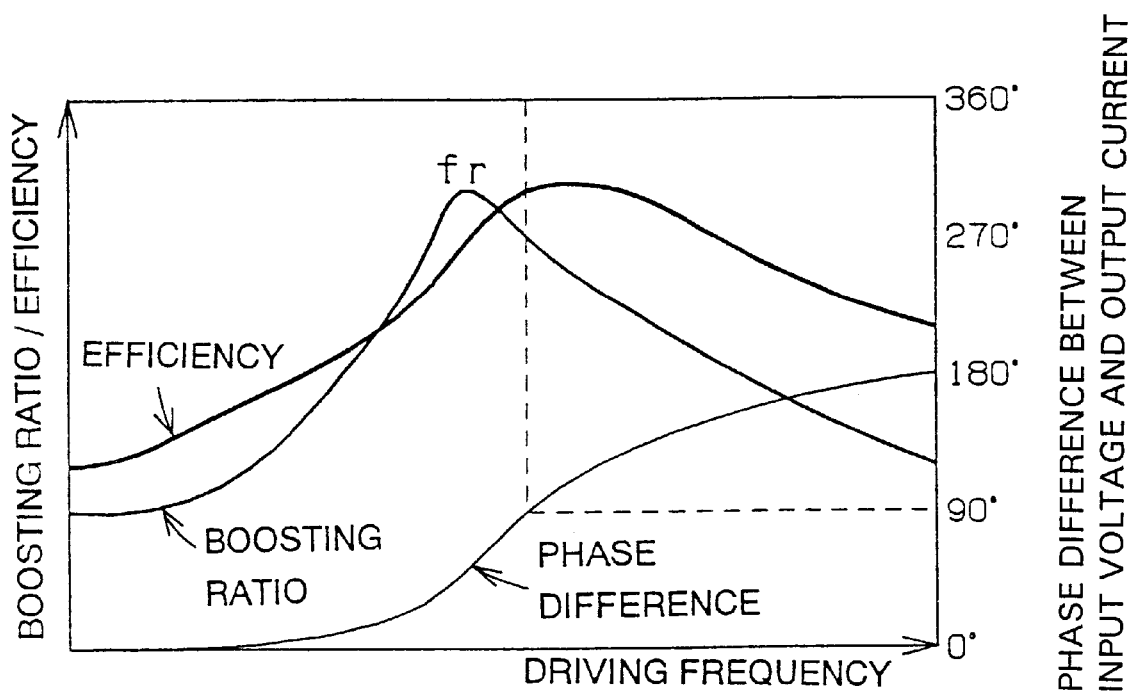
FIG. 10 is a graph illustrating the relationships among the phase difference between an input voltage to and an output current from a piezoelectric transformer, a boosting ratio of the piezoelectric transformer, and its efficiency.

Ordinarily, the piezoelectric transformer 62 operates at its highest efficiency at a frequency which is slightly higher than the driving frequency at which the boosting ratio is maximum, as shown in FIG. 10. The phase difference between the input voltage to and the output current from the piezoelectric transformer 62 is as follows: the output voltage and the output current are in phase at a frequency which is lower than the resonant frequency for and are 180° out of phase at a frequency which is higher than the resonant frequency ft, and the phase difference is 90° at a frequency which is slightly higher than the frequency at which the boosting ratio is maximum; or alternatively, the output voltage and the output current are 180° out of phase at a frequency which is lower than the resonant frequency for and are in phase at a frequency which is higher than the resonant frequency for, and the phase difference is 270° at a frequency which is slightly higher than the frequency at which the boosting ratio is maximum. As generally accepted, the difference between the frequency at which the boosting ratio is maximum and that at which the phase difference is 90° or 270° is varied with the impedance of the load, namely, as the impedance of the load is reduced, the difference is increased. Therefore, it is appropriate that the target of the phase difference to be controlled by the driving frequency control circuit 65 is set at 90°±45° or 270°±45°. The selection of the target value depends on which of the voltages applied to the two primary electrodes 66 is detected, or on the polarization direction of the piezoelectric transformer 62. Thus, as the selection is not essential, the following description will be made with respect to the case of the target value of 90°±45°.

Figure 13A:
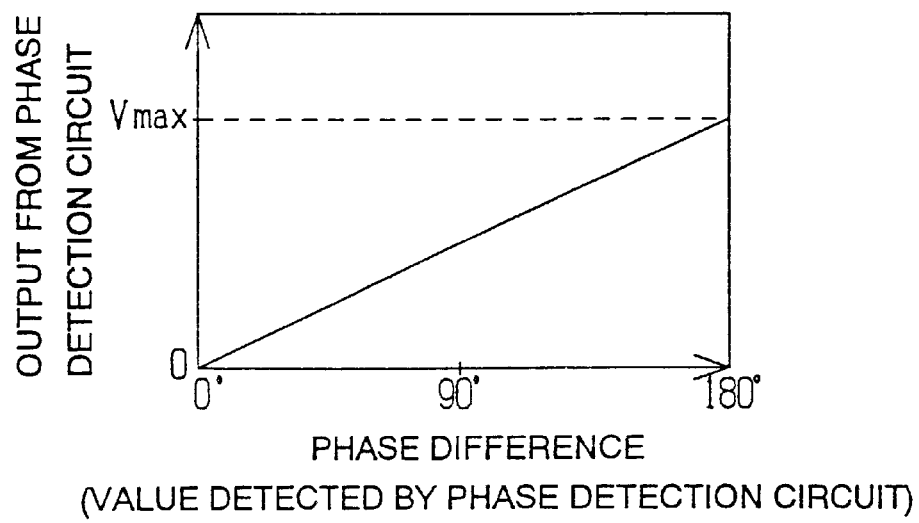
FIG. 13A is a graph illustrating the relationships between a phase difference detected by a phase detection circuit and an output voltage from the phase detection circuit.
Figure 13B:
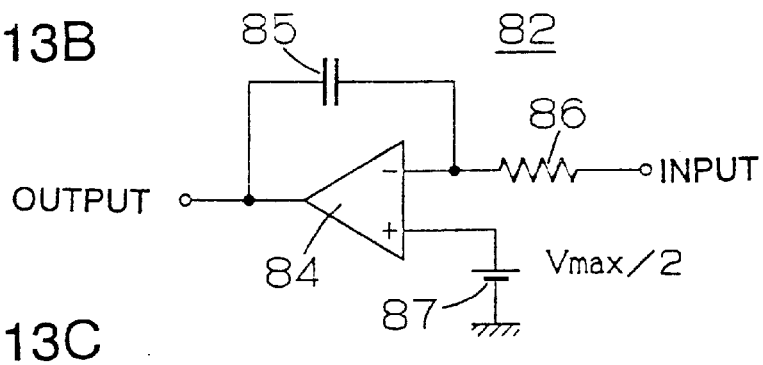
FIG. 13B is a circuit diagram of an integrating circuit.
Figure 13C:
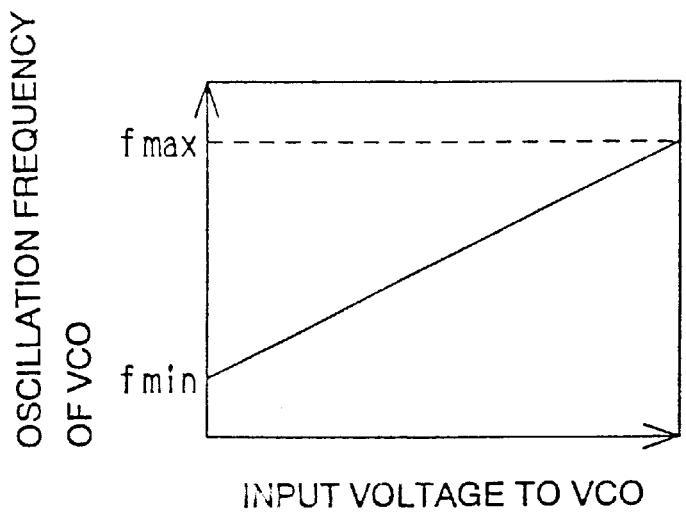
FIG. 13C is a graph showing the relationships between an input voltage to a voltage control oscillator (VCO) and its oscillation frequency.

The phase detecting circuit 81 detects the phase difference between the input voltage to and the output current from the piezoelectric transformer 62, and outputs a voltage signal to the integrating circuit which is proportional to the phase difference, as shown in FIG. 13A. In regard to the configuration of the integrating circuit 82, a capacitor 85 is connected across the inverted input terminal and the output of the operational amplifier 84, as shown in FIG. 13B, so that the output can be negatively fed back, and the output from the phase detecting circuit 81 can be inputted through a resistor 86 to the inverted input terminal of the operational amplifier 84. The reference voltage, which is a half the maximum output voltage Vmax of the phase detecting circuit 81, is applied to the non-inverted input terminal. Thus, the integrating circuit 82 outputs a voltage in correspondence to the difference between the phase difference and 90°. VCO oscillates at an oscillation frequency which corresponds to the input voltage, as shown in FIG. 13 C, and acts to reduce the driving frequency if the phase difference is larger than 90°, based on the output from the integrating circuit 82 and increase the driving frequency if the phase difference is smaller than 90°. The two-phase drive circuit 73 of the boosting drive circuit 63, based on the output from the driving frequency control circuit 65, causes the transistors 71 and 72 to turn on-off for the control of the piezoelectric transformer 62. Thus, the driving frequency is so controlled that the phase difference between the input voltage to and the output current from the piezoelectric transformer 62 is 90°. In the instant embodiment, the description is made with respect to the phase difference setting of 90°. However, in some cases, the highest efficiency is obtained at a phase angle other than 90°. For this reason, for practical design, the phase difference setting at which the efficiency is highest may be selected in the range of 90°±45° or 270°±450°.

As seen in FIG. 10, if the driving frequency of the piezoelectric transformer 62 is so controlled that the phase difference between the input voltage to and the output current from the piezoelectric transformer 62 is near to 90°, the driving frequency can be kept at the vicinity to the resonant frequency of the piezoelectric transformer 62, and can be driven at a frequency at which the efficiency is high even if the load and environment temperature conditions are changed.

The advantages of the piezoelectric transformer inverter 61 will be described below. The piezoelectric transformer inverter 61 is provided with the driving frequency control circuit 65 in which the driving frequency is so changed and controlled that the phase difference between the input voltage to be applied to the primary electrodes of the piezoelectric transformer 62 and the output current to be supplied from the piezoelectric transformer 62 to the fluorescent tube 68 is made constant (near to 90° or 270°). Accordingly, the piezoelectric transformer 62 can be always operated at a frequency at which the efficiency is highest even if the use conditions such as the load-current, the ambient temperature, or the like are changed.

It is known that methods of driving the piezoelectric transformer can be roughly divided into systems containing a push-pull circuit and systems employing a class "semi-E" amplifying circuit. The systems containing a push-pull circuit, thought they are advantageous in that the output current can be easily changed by adjusting the duty ratios of transistors used in a driving circuit and the like, have a higher switching loss as compared with the class "semi-E" amplifying circuit. The efficiency is relatively low. On the other hand, the systems employing the class "semi-E" amplifying circuit have a high efficiency since the switching loss can be remarkably reduced, though it is disadvantageous in that it is very difficult to control the output current by changing the duty ratio of a driving circuit or the like. According to the piezoelectric transformer inverter 61 of the present invention, which contains the boosting drive circuit 63 having a class "semi-E" amplifying circuit configuration, the switching loss of the transistors 71 and 72 can be reduced, and the efficiency of the piezoelectric transformer inverter 61 can be enhanced.

In the case of piezoelectric transformer inverters for use with fluorescent tubes, a brightness conditioning function is needed to adjust the brightness of a liquid crystal panel. The brightness of the fluorescent tube is in a proportional relationship to the tube current. Accordingly, for the piezoelectric transformer inverters, it is required to have a function of controlling the output current at a target setting. In the case of the driving frequency controlled to be constant, for the purpose of controlling the tube current, there are available (1) a system for changing the duty cycle of a transistor (FET) to drive the piezoelectric transformer and (2) a system by which a switching component is included in the preceding stage of a driving circuit to change an average input voltage to the driving circuit. According to the former system (1), it is unnecessary to provide an additional transistor, thereby reducing costs. However, for practical uses, only the push-pull circuit configuration having a relatively low efficiency can be used. There is the problem that for the system (1), though it contains the push-pull circuit configuration, the waveform to be applied to the piezoelectric transformer departs from a sinusoidal waveform, considerably reducing the efficiency, if the range of the duty ratio is very narrow. In contrast, for the piezoelectric transformer inverter 61, the latter system (2) which can be equipped with a boosting drive circuit to provide for the class "semi-E" operation is employed. The piezoelectric transformer inverter 61 can be operated at high efficiency, in a wide input voltage range, and can control a load-current at a required constant value.

Thus, according to the piezoelectric transformer inverter 61 of the present invention, the efficiency can be kept high in a wide input voltage range and in a wide light-modulation range, which has been impossible by means of the conventional piezoelectric transformers.

(Second Embodiment)

Figure 14:
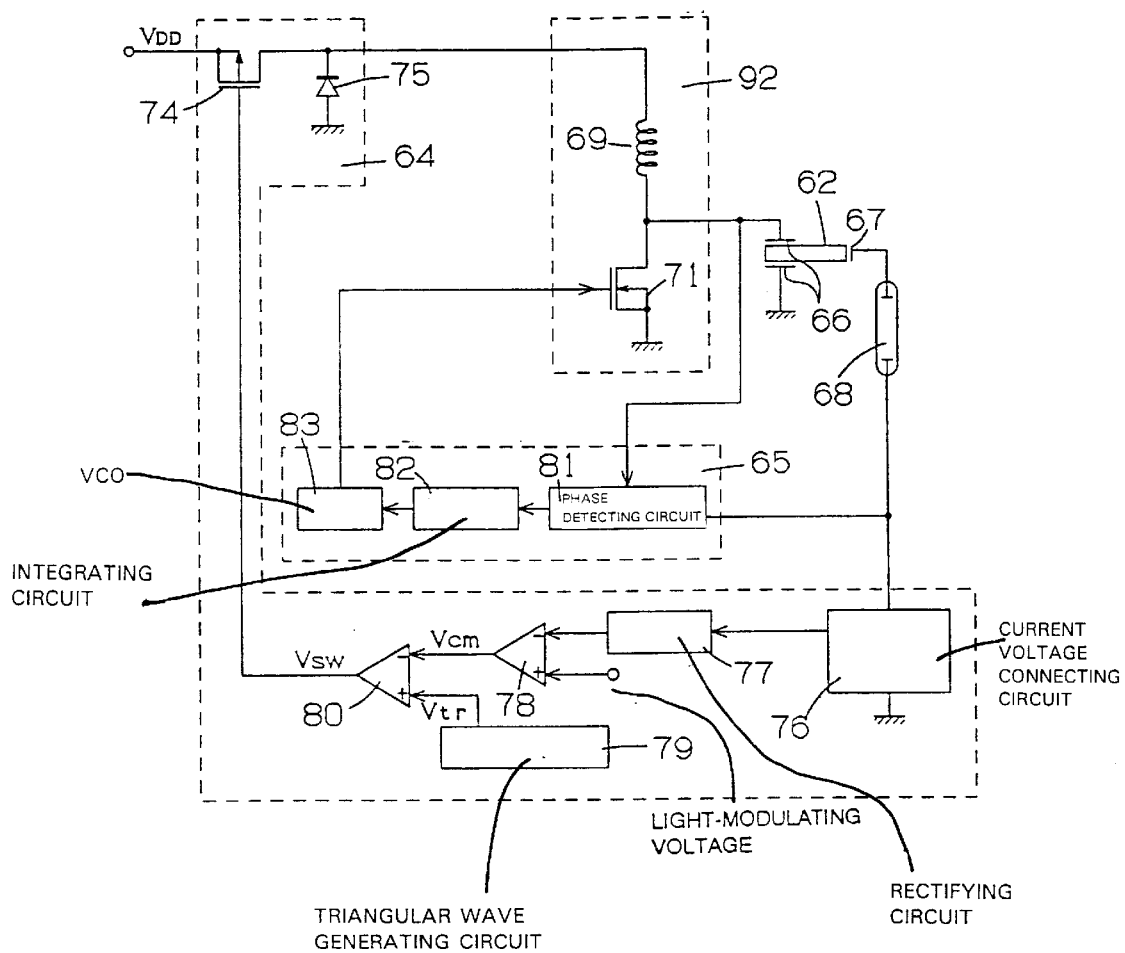
FIG. 14 is a circuit diagram of a piezoelectric transformer inverter according to a second embodiment of the present invention.

FIG. 14 is a circuit diagram showing the configuration of a piezoelectric transformer inverter 91 according to a second embodiment of the present invention. In the piezoelectric transformer inverter 91, the configurations of the driving voltage control circuit 64 and the driving frequency control circuit 65 are the same as those of the piezoelectric transformer inverter 61 of FIG. 11 according to the first embodiment. A boosting drive circuit 92 provides for the class "semi-E" operation as well, but is made up of one coil 69 and one transistor 71 connected in series. One of the primary electrodes 66 of the piezoelectric transformer 62 is connected to the middle point between the coil 69 and the transistor 71 of the boosting drive circuit 92, and the other is grounded.

Figure 1:
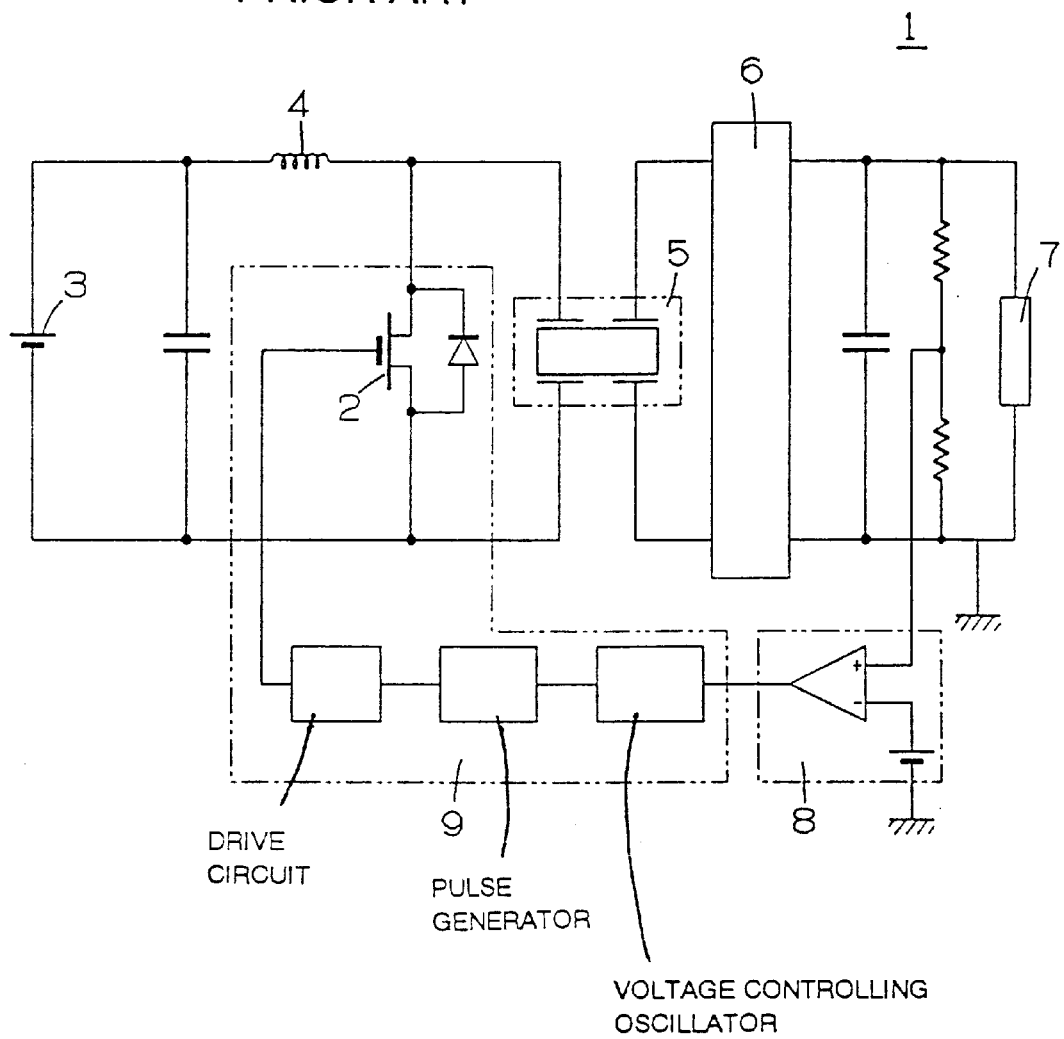
FIG. 1 is a circuit diagram of a first conventional piezoelectric transformer.
Figure 2:
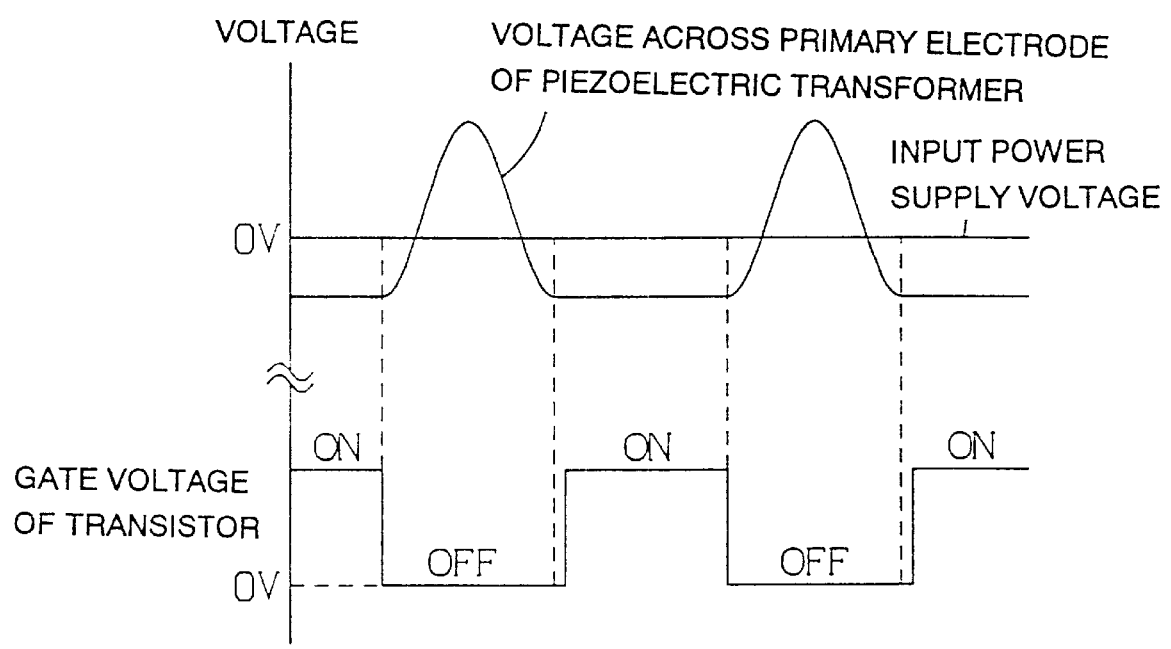
FIG. 2 is a waveform chart illustrating the relationships among the gate voltage of a transistor, an input power supply voltage, and an input voltage applied across the primary electrodes of a piezoelectric transformer in the first conventional piezoelectric transformer inverter.
Figure 3:
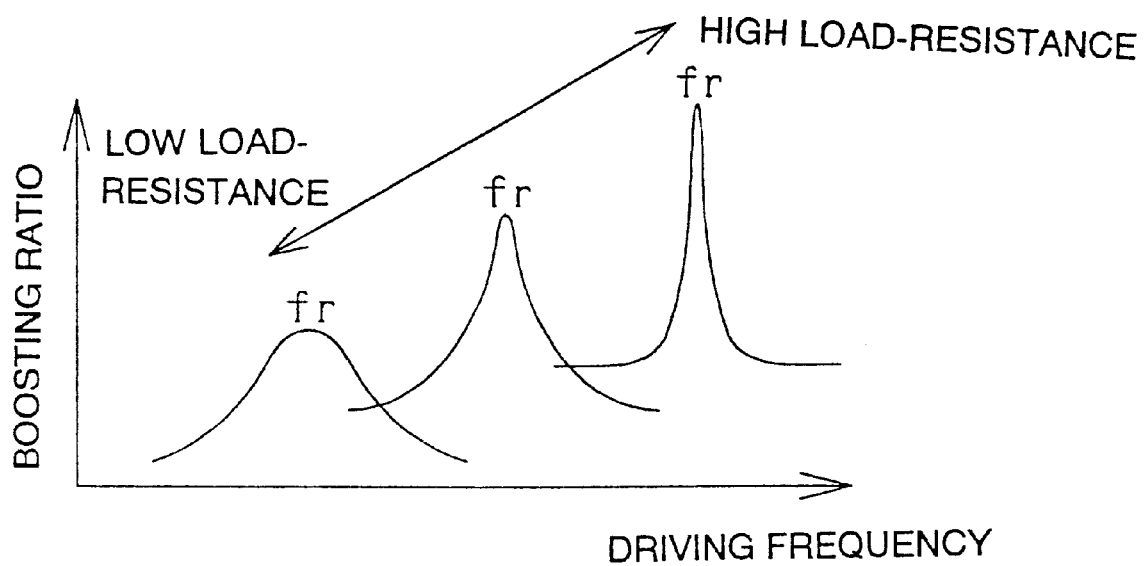
FIG. 3 is a graph illustrating changes in the resonant frequency and boosting ratio of the piezoelectric transformer, with the different resistances of a load.
Figure 4:
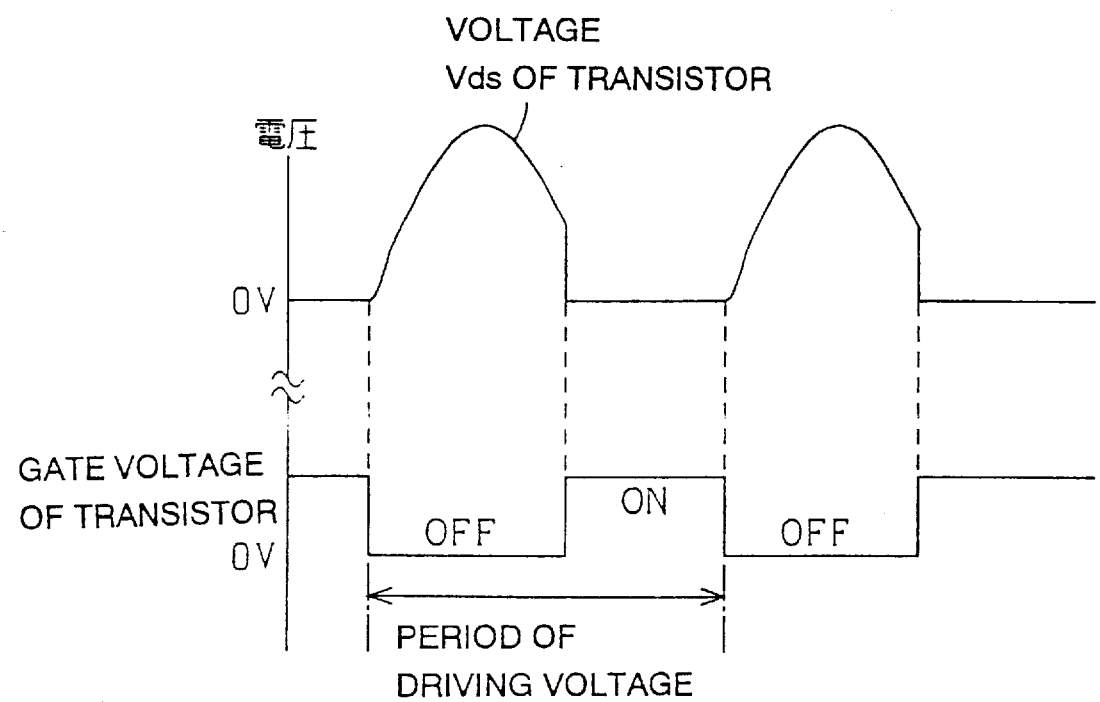
FIG. 4 is a chart illustrating problems on the first conventional piezoelectric transformer inverter.
Figure 5:
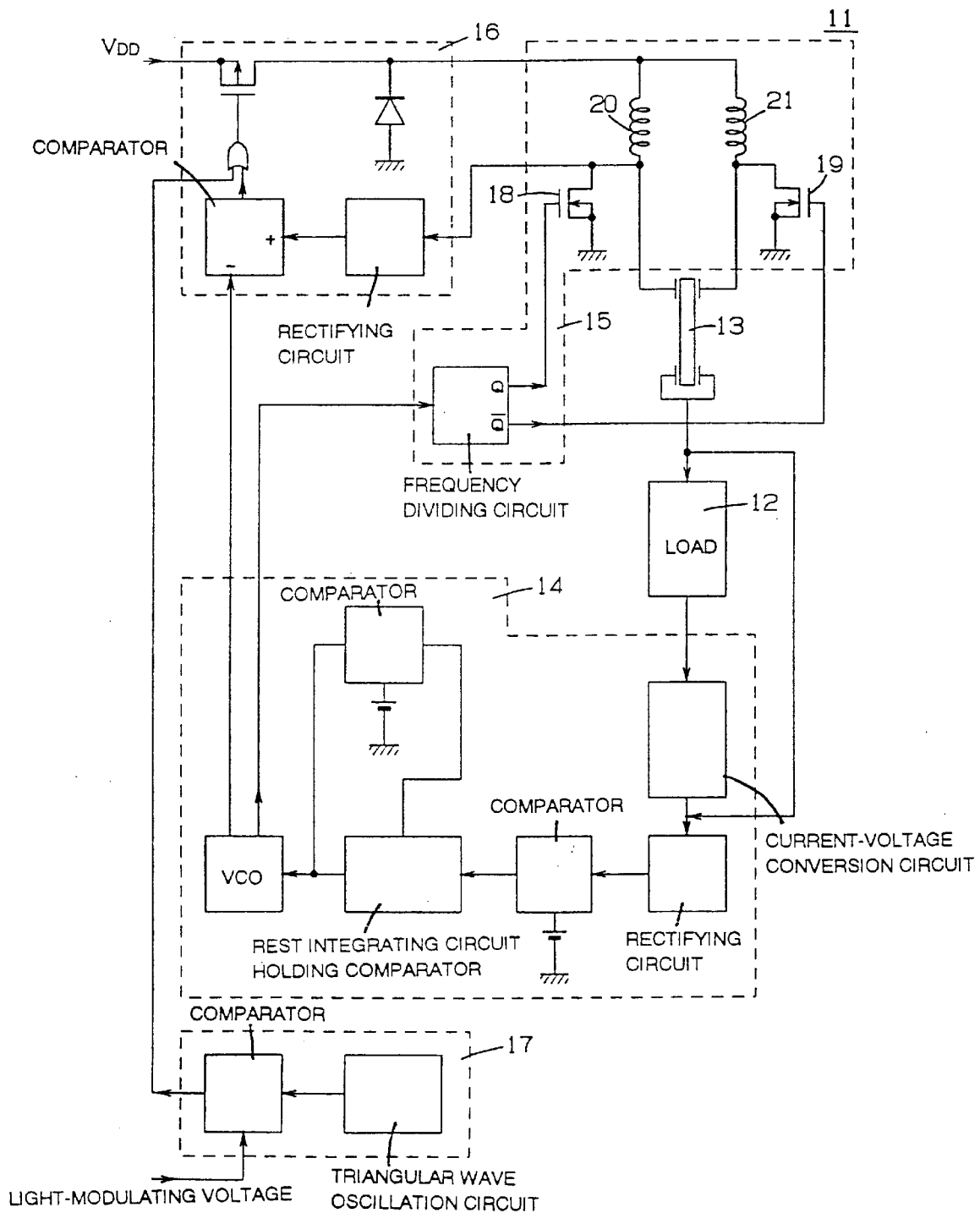
FIG. 5 is a circuit diagram of a second conventional piezoelectric transformer inverter.

In regard to the piezoelectric transformer inverter 91, the voltage across the primary electrodes of the piezoelectric transformer 62 has such a waveform as shown in FIG. 2 (described in the first conventional example). It is seen that this waveform, as compared with that of the piezoelectric transformer inverter 61 of FIG. 11, departs from a sinusoidal waveform. Furthermore, the voltage across the primary electrodes is about one half that of the piezoelectric transformer inverter 61 of FIG. 11. Thus, the piezoelectric transformer inverter 91 is appropriate for use when the input power supply voltage VDD is high.

The piezoelectric transformer inverter of the instant embodiment, as compared with that of the first embodiment, has a low efficiency, can be operated in a wide input voltage range and in a wide light modulation range. For the piezoelectric transformer inverter of the instant embodiment, on coil and one transistor can be reduced as compared with that of the first embodiment. Thus, the number of components may be reduced, and the low cost can be realized.

(Third Embodiment)

Figure 15:
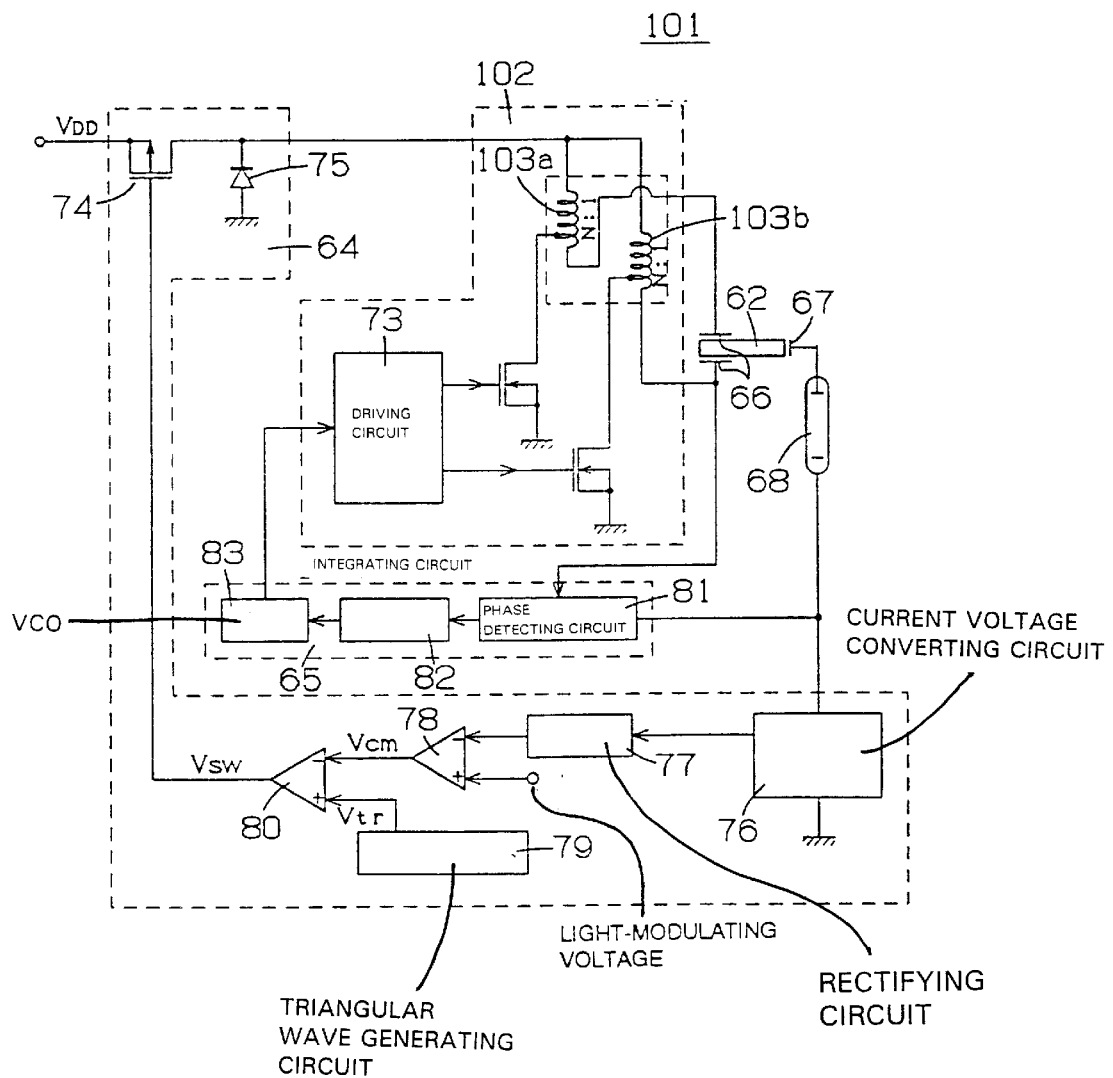
FIG. 15 is a circuit diagram of a piezoelectric transformer inverter according to a third embodiment of the present invention.

FIG. 15 is a circuit diagram showing the configuration of a piezoelectric transformer inverter 101 according to a third embodiment of the present invention. The piezoelectric transformer inverter 101 is different from the piezoelectric transformer inverter 61 in the configuration of the boosting drive circuit. More particularly, a boosting drive circuit 102 of the piezoelectric transformer inverter 101 employs autotransformers 103a and 103b, instead of the coils 69 and 70 of the first embodiment, respectively. The turn ratio of the primary winding to the secondary winding of the respective autotransformers 103a and 103b is 1:N. The ends of the primary windings (primary terminals) are connected to the driving voltage control circuit 64, and the ends of the secondary windings (secondary terminals) to the primary electrodes 66 of the piezoelectric transformer 62, respectively. The intermediate terminals between the primary and secondary terminals are connected to the transistors 71 and 72, respectively. Since the turn ratio of the primary winding to the secondary winding of the respective autotransformers 103a and 103b is 1:N, the voltage across the primary electrodes of the piezoelectric transformer 62 is increased to be (1+N) times that in the first embodiment. For this reason, in the instant embodiment, the driving voltage of the piezoelectric transformer 62 is greater than that of the first embodiment. The piezoelectric transformer inverter 101 is appropriate for cases where the boosting ratio of the piezoelectric transformer 62 is deficient, a higher output is required, the input power supply voltage VDD is low, and so forth.

Referring to the selection of the respective inductances of the autotransformer 103, the inductance may be so selected that the resonant frequency, determined by the inductance between the primary winding terminal and the secondary winding terminal, are equal to the driving frequency of the piezoelectric transformer, respectively. In other words, the inductance between the primary terminal and the secondary terminal is so selected as to be equal to the inductance of the coil 69 or 70 in the first embodiment, respectively.

(Fourth Embodiment)

Figure 16:
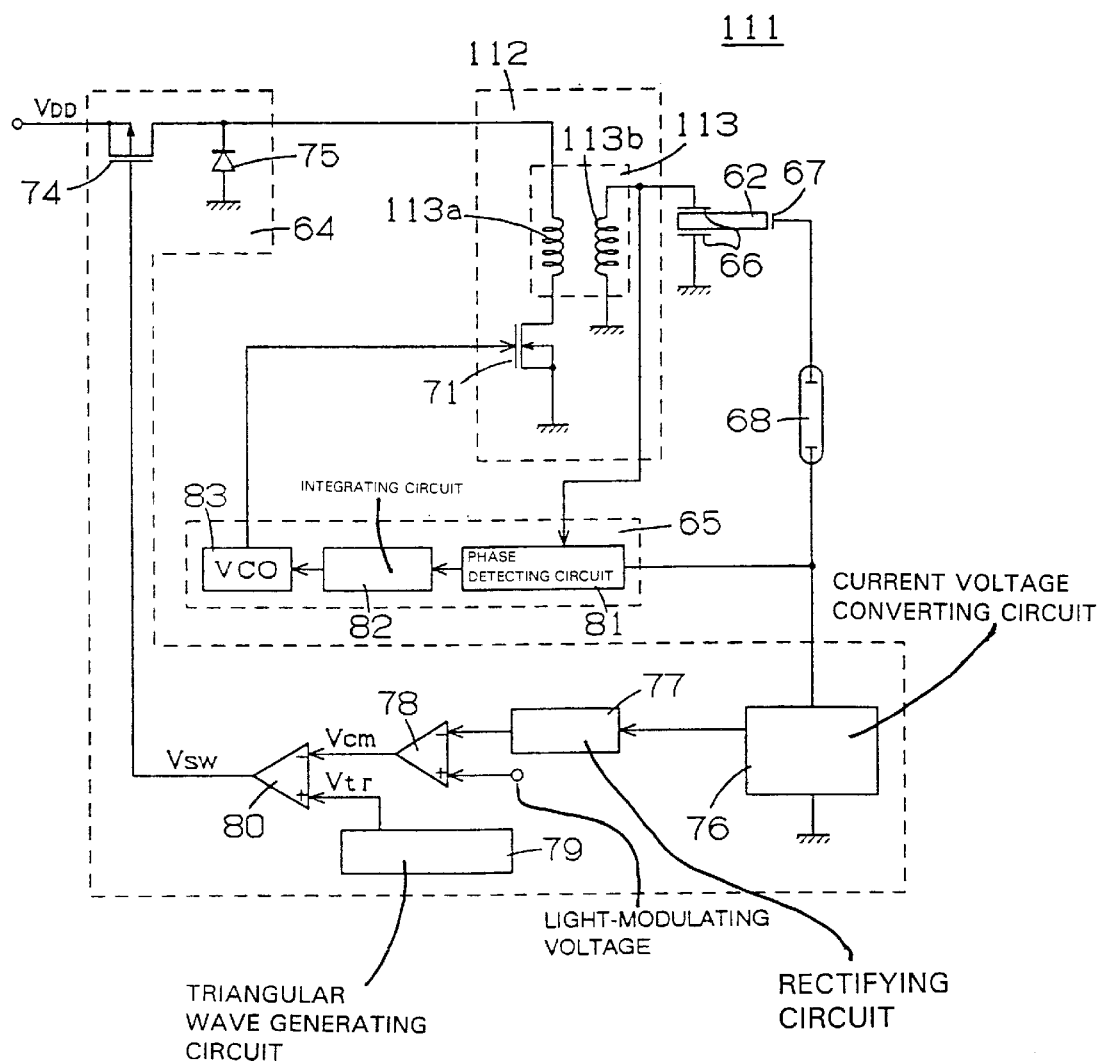
FIG. 16 is a circuit diagram of a piezoelectric transformer inverter according to a fourth embodiment of the present invention.

FIG. 16 is a circuit diagram showing the configuration of a piezoelectric transformer inverter 111 according to a fourth embodiment of the present invention. The piezoelectric transformer inverter 111 is different from the piezoelectric transformer inverter 91 of the second embodiment in the configuration of the boosting drive circuit. More particularly, a boosting drive circuit 112 of the piezoelectric transformer inverter 111 employs a boosting transformer 113, instead of the coil 69 in the second embodiment. The primary winding 113a of the boosting transformer 113 is connected to the driving voltage control circuit 64 and the transistor 71. One end of the secondary winding 113b is grounded, and the other end is connected to the primary electrode 66 of the piezoelectric transformer 62. The turn ratio of the primary winding 113a to the secondary winding 113b of the boosting transformer 113 is 1:N. Therefore, the voltage across the primary electrodes of the piezoelectric transformer 62 is N times that in the second embodiment. Thus, in the instant embodiment, since the driving voltage of the piezoelectric transformer 62 can be further enhanced, the piezoelectric transformer inverter 111 is also applicable for the cases where the input supply voltage is low, and a high output to the load is required, and for which the piezoelectric transformer inverter 91 of the second embodiment is unsuitable.

(Fifth Embodiment)

Figure 17:
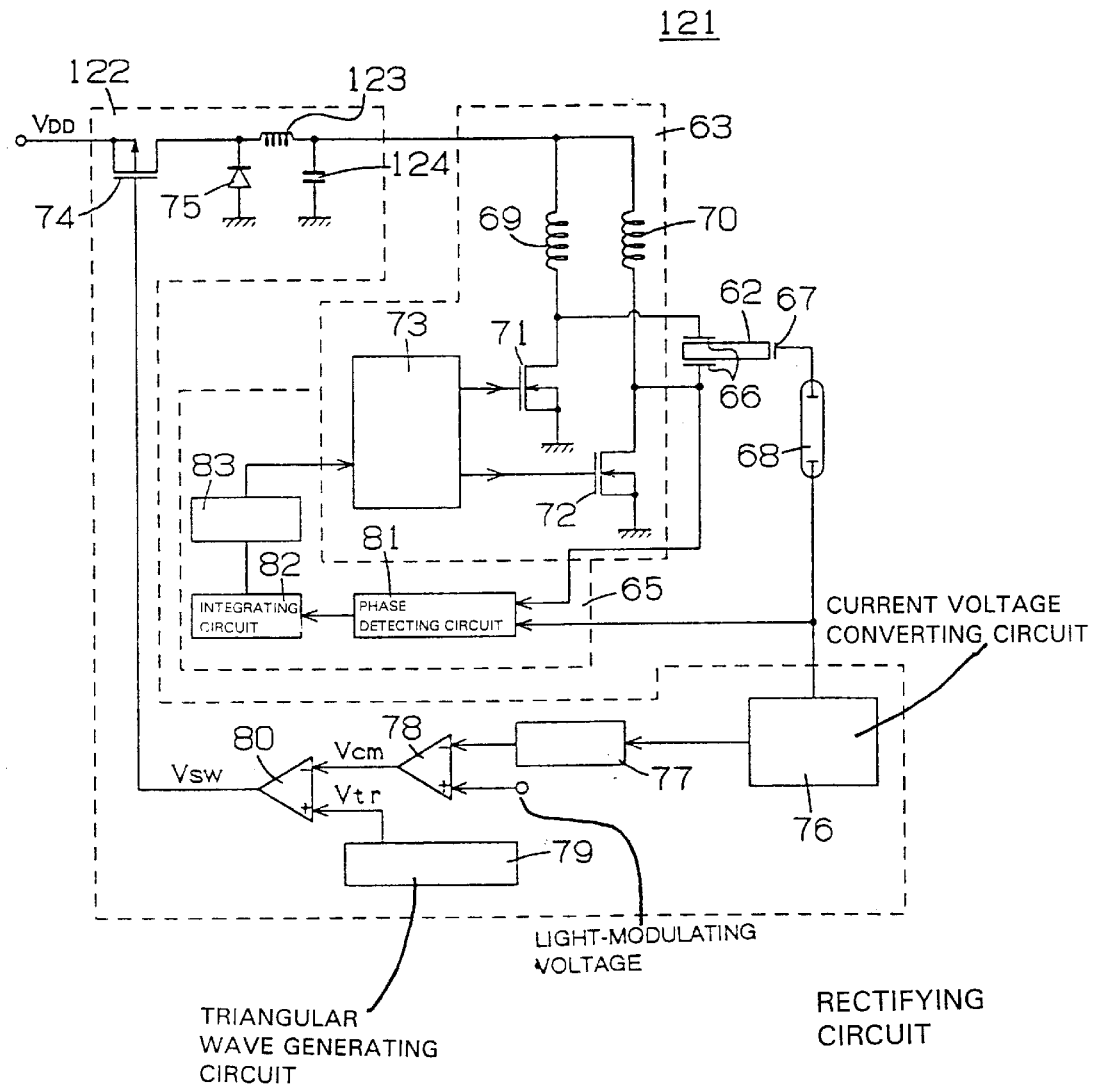
FIG. 17 is a circuit diagram of a piezoelectric transformer inverter according to a fifth embodiment of the present invention.

FIG. 17 is a circuit diagram showing the configuration of the piezoelectric transformer inverter 121 according to a fifth embodiment of the present invention. In the piezoelectric transformer inverter 121, the configurations of the boosting drive circuit 63 and the driving frequency control circuit 65 are the same as those in the piezoelectric transformer inverter 61 of the first embodiment, shown in FIG. 11. In a driving voltage control circuit 122, a diode 75 is included as a circulation current retaining means, a choke coil 123 is included between the diode 75 and the boosting drive circuit 63, a rectifying smoothing capacitor 124 is connected to the middle point between the choke coil 123 and the boosting drive circuit 63, and the other end of the rectifying smoothing capacitor 124 is grounded, so that the voltage to be supplied to the boosting drive circuit 63 is further stabilized. As seen in the above description, needless to say, a switching component may be employed as the circulation current retaining means.

Since the piezoelectric transformer inverter 121 additionally includes the choke coil 123 and the rectifying smoothing capacitor 124 in the driving voltage control circuit 122, the restriction of the driving voltage control circuit 122 on the switching frequency is dismissed. That is, the switching can be carried out at a frequency lower than the driving frequency of the piezoelectric transformer 62. This reduces the switching loss of the transistors 71 and 72 for switching, and thereby, the efficiency of the driving voltage control circuit 122 can be further enhanced.

As shown in FIG. 17, as the driving voltage control circuit 122, a voltage-decreasing type DC—DC converter is employed. However, for example, a boosting type DC—DC converter may be used. If the boosting type DC—DC converter is used, the input power supply voltage can be increased before hand. Accordingly, the piezoelectric transformer inverter 121 is applicable for uses where the input voltage to the piezoelectric transformer is low.

In the instant embodiment, the input voltage to the boosting drive circuit 63 can be further stabilized, though the number of used components such as the choke coil 123, the rectifying smoothing capacitor 124, or the like is increased. Thus, the withstand voltage characteristics of the transistors and the coil size can be reduced as compared with those in the second embodiment. If the boosting type DC—DC converter or the voltage-decreasing type DC—DC converter is employed as the driving voltage control circuit 122, the input voltage range can be further extended.

(Sixth Embodiment)

Figure 18:
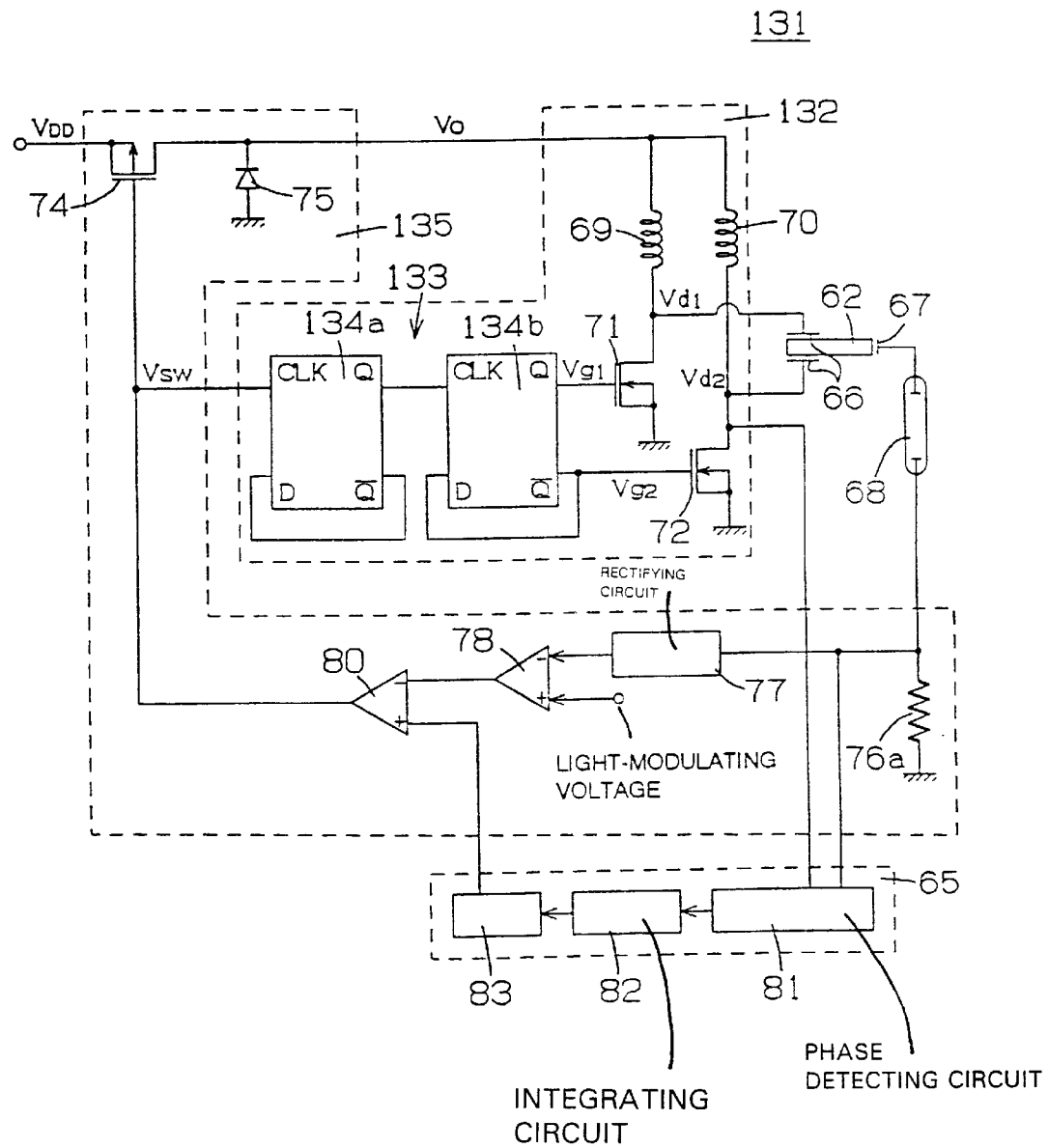
FIG. 18 is a circuit diagram of a piezoelectric transformer inverter according to a sixth embodiment of the present invention.

FIG. 18 is a circuit diagram showing the configuration of a piezoelectric transformer inverter 131 according to a sixth embodiment of the present invention. In regard to the piezoelectric transformer inverter 131, the output signal (output signal from VCO 83) from the driving frequency control circuit 65 where the phase difference between the input voltage to the piezoelectric transformer 62 and the output current to the fluorescent tube 68 is detected, and the frequency of the output signal is so controlled that the phase difference is made constant, is made to have a triangular waveform, and is inputted through the non-inverted input terminal of the comparator 80 of a driving voltage control circuit 135. In a boosting drive circuit 132, a two-phase drive circuit 133 is formed of a quadruple frequency-dividing circuit comprising two D-flip flops 134a and 134b connected in series. In the two-phase drive circuit 133, the output from the comparator 80 of a driving voltage control circuit 135 is divided to have one-quarter frequency, and the two transistor 71 and 72 are controlled to be on-off, alternately, to drive the piezoelectric transformer 62. Thus, in the piezoelectric transformer inverter 131, the driving frequency control circuit 65 has a function as a triangular wave generating circuit, in addition to the essential phase controlling function.

Figure 19:
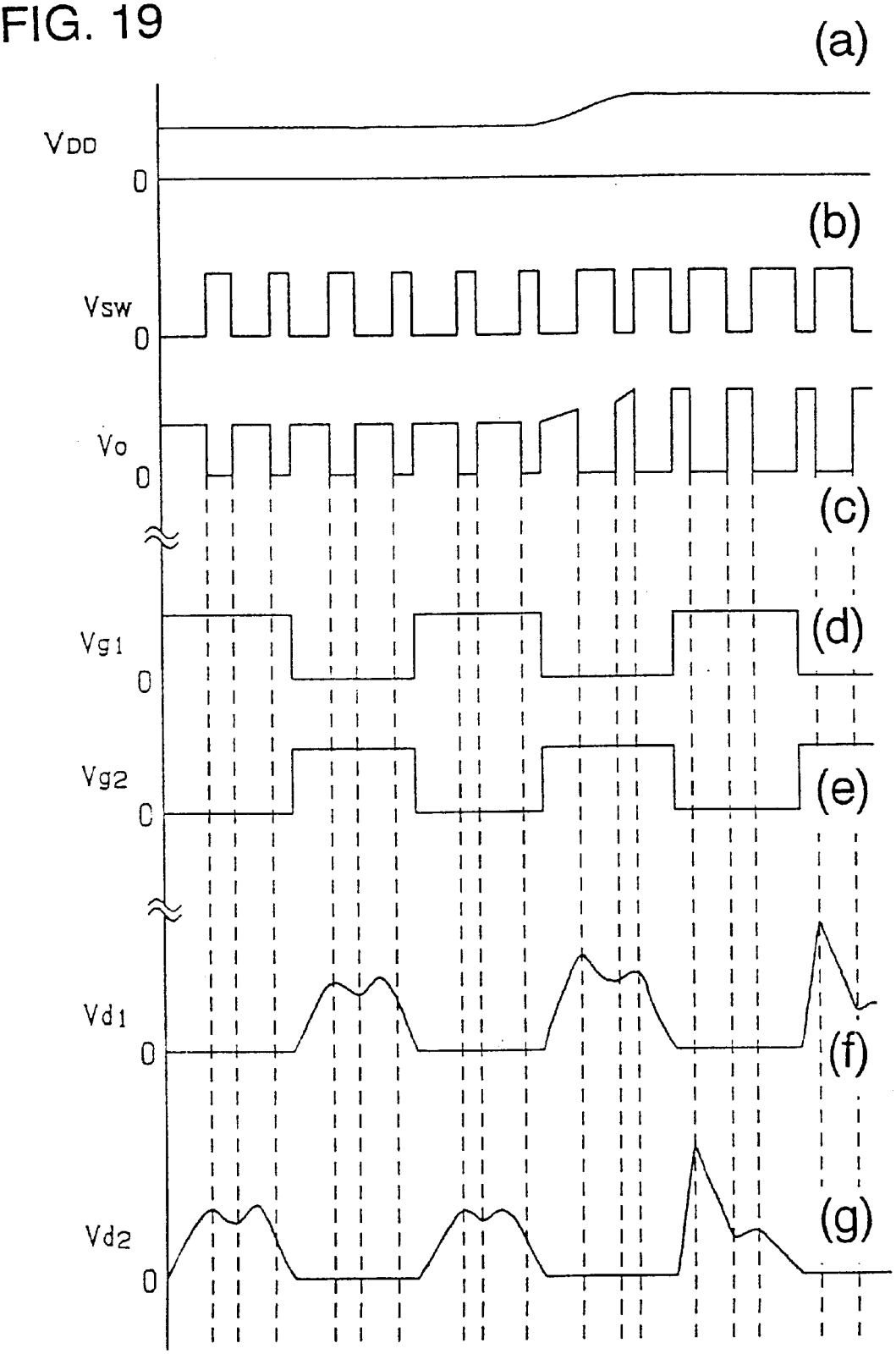
FIGS. 19A–19G are waveform charts of the respective sections of the piezoelectric transformer inverter of the sixth embodiment.

The operation of the piezoelectric transformer inverter 131 is illustrated in FIG. 19. FIG. 19A shows the input power supply voltage VDD, in which the voltage begins to increase half-way. FIG. 19B shows the output voltage from the comparator 80 of the driving voltage control circuit 135; FIG. 19C the signal outputted from the driving voltage control circuit 135 to the boosting drive circuit 132; FIGS. 19D and 19E the control signals for the respective transistors 71 and 72, outputted from the two-phase drive circuit 133; and FIGS. 19F and 19G the driving voltages outputted from the boosting drive circuit 132 to the primary electrodes 66 of the piezoelectric transformer 62, respectively. As seen in the above description, when the input power supply voltage VDD is changed, the duty ratio is so changed that the switching voltage VSW, outputted from the comparator 80, causes the switching transistor 74 to be on, and the average direct current voltage to be supplied to the boosting drive circuit 132 is kept constant. Further, the average voltage every driving waveform of the piezoelectric transformer can be made constant by setting the switching frequency (FIGS. 19B and 19C) of the switching transistor 74 in the driving voltage control circuit 135 to be four times higher than the driving frequency of the piezoelectric transformer 62 (FIGS. 19D and 19E). Therefore, the transistors 71 and 72 of the boosting drive circuit 132 are not needed to have high withstand voltage characteristics. Accordingly, since the current flowing in the coils 69 and 70 is not significantly increased, the coils 69 and 70, having a smaller size, can be employed. Further, as seen easily, the driving frequency of the switching transistor 74 needs to be at least two times higher than the driving frequency of the piezoelectric transformer 62 in order to keep constant the average voltage every driving waveform of the switching transistor 74. As the frequency multiplication is higher, the input to the boosting drive circuit 132 is averaged more uniformly, but the driving loss of the switching transistor 74 is increased. For this reason, it is suggested that an appropriate frequency multiplication is selected at which the efficiency is optimum for the individual design.

In the instant embodiment, the electric power every driving waveform to be applied to the current detecting circuit 52 can be kept constant by setting the switching frequency of the driving voltage control circuit 135 to be at least tow times higher than the driving frequency of the piezoelectric transformer 62. Therefore, the transistors 71 and 72 having low withstand voltage characteristics can be employed. The peak currents flowing in the coils 69 and 70 can be reduced. Accordingly, the coils 69 and 70 having a small size can be employed.

(Seventh Embodiment)

As regards the back lights for liquid crystal display panels, the brightness of a liquid crystal panel is ordinarily conditioned by controlling the amount of tube current flowing a fluorescent tube. However, in event that the tube current is excessively reduced, the fluorescent tube is off in some cases. Accordingly, the controlling range of the tube current is limited to only several times. On the other hand, for a liquid crystal panel for used in a note-size personal computer and the like, there are some cases where the brightness controlling range needs to have a multiplication of at least ten. For these cases, there is employed a system by which the fluorescent tube is intermittently operated, and while the fluorescent tube is on, a sufficient tube current is made to flow.

Figure 20:
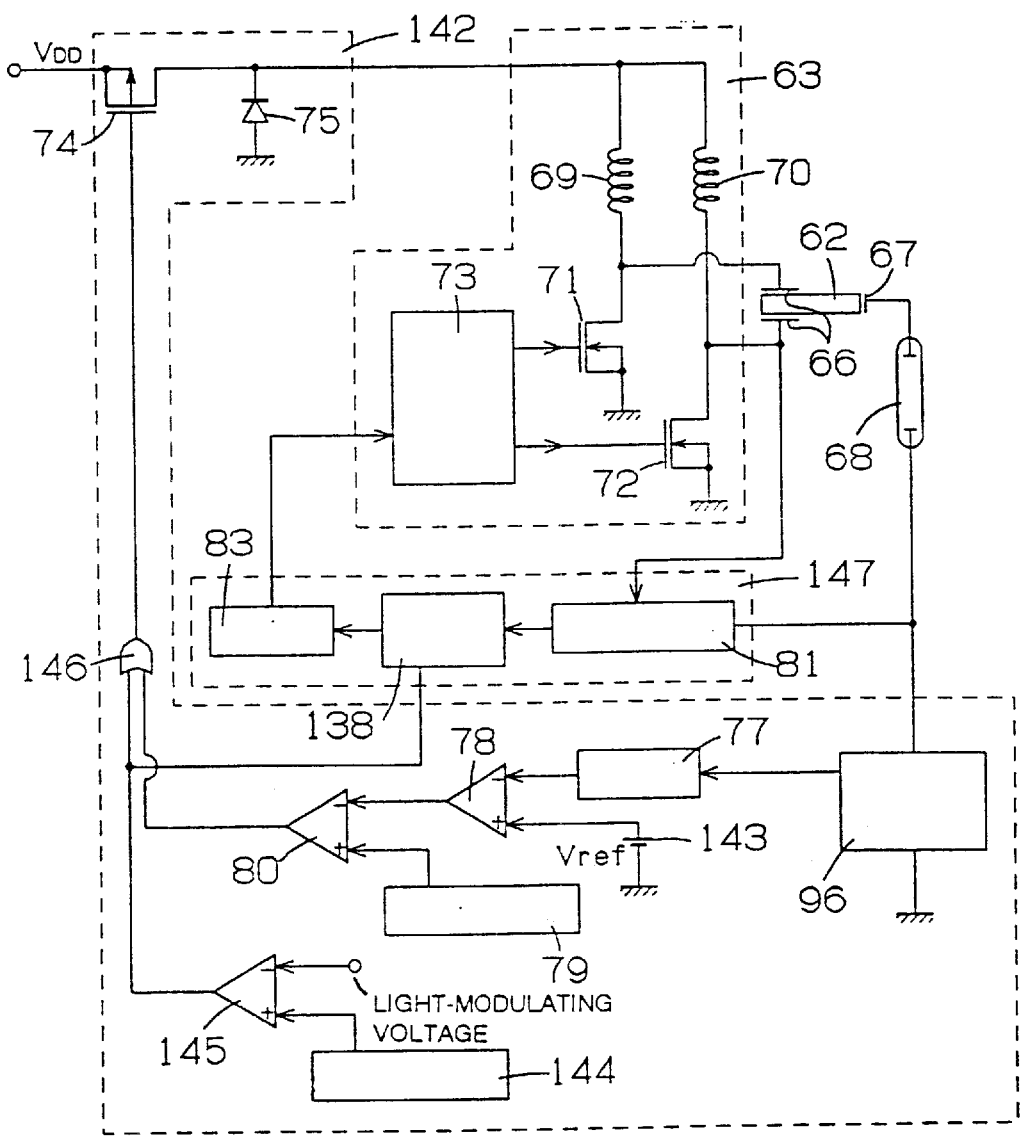
FIG. 20 is a circuit diagram of a piezoelectric transformer inverter according to a seventh embodiment of the present invention.

FIG. 20 is a circuit diagram of a piezoelectric transformer inverter 141 according to a seventh embodiment of the present invention. The piezoelectric transformer inverter 141, for the purpose of meeting the above-described requirements, is so configured that the switching transistor 74 of a driving voltage control circuit 142 is intermittently operated and stopped at a period sufficiently longer than the operation frequency of the boosting drive circuit 63.

More particularly, the differential amplifier 78 in the piezoelectric transformer inverter 141 compares a voltage converted from the tube current flowing in the fluorescent tube 68 with a reference voltage Vref to output. The comparator 80 compares the output with a triangular wave generated in the triangular wave generating circuit 79 and on-off controls the switching transistor 74 at a high switching frequency, so that a constant current is made to flow in the fluorescent tube 68. A light-modulating voltage is inputted to the inverted-input terminal of a comparator 145, and a triangular wave voltage, generated in a triangular wave generation circuit 144, is done to the non-inverted input terminal. The output of the comparator 145, together with the output of the comparator 80, is connected through an OR gate 146 to the gate electrode of the switching transistor 74. The triangular wave voltage, outputted from the triangular wave generation circuit 144, has a period (100–500 Hz) sufficiently longer than the triangular wave voltage generated in the triangular wave generating circuit 79. Therefore, the on-off operation of the switching transistor 74 can be intermittently stopped at a period sufficiently longer that the switching period thereof. Accordingly, the brightness of the fluorescent tube 68 can be conditioned in a wide range by controlling the light-modulating voltage. The integrating circuit is so configured that the output is kept at its directly preceding value when its stop terminal is "high" (high potential). As the stop terminal is connected to the output of the comparator 145, the output voltage from the integrating circuit 138 is kept at its value directly before the switching transistor is stopped, during the period of time while the switching transistor 74 is stopped. This prevents the frequency from being unstable, which occurs when the switching transistor 74 re-starts to operate, tat is, when the tube current begins to flow in the fluorescent tube 68.

The fluorescent tube 68 in the piezoelectric transformer inverter 141 can be intermittently operated. Thus, the light-modulating range can be set to be wider, as compared with that in the first embodiment. Accordingly, the wide light modulating range with a multiplication of about 10, required for the note-size personal computer and the like, can be realized.

The piezoelectric transformer inverter of the instant embodiment, though it is similar to that disclosed in Japanese Unexamined Patent Publication No. 9-107684, is essentially different from the disclosed piezoelectric transformer inverter in that even if the boosting ratio of the piezoelectric transformer, the impedance of the load, and the like is varied with changes in temperature, and the like, the efficiency can be kept high, attributed to the phase-controlling function.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A piezoelectric transformer inverter comprising:

a piezoelectric transformer for converting an alternating voltage applied across its primary electrodes to an alternating current which is supplied to a load connected to its secondary electrode;

a boosting drive circuit made up of a first series combination of a first coil and a first switching element for applying a voltage to one of said primary electrodes of said piezoelectric transformer, a second series combination of a second coil with a second switching element for applying a voltage to another of said primary electrodes of said piezoelectric transformer, and a two-phase drive circuit for alternately driving said first and second switching elements;

a driving voltage control circuit connected between an input terminal of said series combinations and an input power supply and adapted to control an average voltage applied to said input terminal of said series combinations whereby current on a secondary electrode side of said piezoelectric transformer is maintained at a constant level; and a driving frequency control circuit which controls a driving frequency at which said first and second switching elements are driven in such a manner that the phase difference between said alternating voltage applied to said primary electrodes of said piezoelectric transformer and said alternating current flowing supplied to said load is maintained at a predetermined value.

2. A piezoelectric transformer according to claim 1, wherein:

said voltage applied to one of said primary electrodes of said piezoelectric transformer is located at a point intermediate of said first coil and said first switching element; and said voltage applied to said another of said primary electrodes of said piezoelectric transformer is located at a point intermediate of said second coil and said second switching element.

3. A piezoelectric transformer according to claim 1, wherein said coils comprise autotransformers connected between the output of said driving voltage control circuit and said primary electrodes of said piezoelectric transformer, said autotransformers having intermediate terminals which are connected to respective ones of said switching elements.

4. A piezoelectric transformer according to one of claim 1, wherein said coils comprise a boosting transformer whose secondary winding is connected across said primary electrodes of said piezoelectric transformer.

5. A piezoelectric transformer according to claim 1, wherein the phase difference between the alternating voltage applied to said primary electrodes of said piezoelectric transformer and the alternating current flowing in said load is set at $90°±45°$.

6. A piezoelectric transformer according to claim 1, wherein the phase difference between the alternating voltage applied to said primary electrodes of said piezoelectric transformer and the alternating current flowing in said load is set at $270°±45°$.

7. A piezoelectric transformer according to claim 1, wherein said driving voltage control circuit includes a third switching element for switching the supply of the input power supply voltage to said boosting drive circuit, and a circulation current retaining means, the switching frequency of said third switching element being at least double said driving frequency.

8. A piezoelectric transformer according to claim 1, wherein said driving voltage control circuit includes a third switching element for switching the supply of the input power supply voltage to said boosting drive circuit on and off, and a circuit which causes said third switching element to be turned on and off with a period which is longer than that of said driving frequency.

9. A piezoelectric transformer according to claim 1, wherein said driving voltage control circuit includes a third switching element for switching the supply of the said input power supply voltage to said boosting drive circuit on and off, a coil located between said switching element and said boosting drive circuit, and a circulation current retaining means and a smoothing capacitor connected to respective opposite sides of said coil.

10. A piezoelectric transformer inverter comprising:

a piezoelectric transformer having one of its primary electrodes grounded and adapted to convert an alternating voltage applied to the other of its primary electrodes to an alternating current which is supplied to a load connected to its secondary electrode;

a boosting drive circuit containing a series combination of a coil and a switching element for applying a voltage to said other of said primary electrodes of said piezoelectric transformer;

a driving voltage control circuit connected between an input terminal of said series combination and an input power supply and adapted to control an average voltage applied to said input terminal of said series combination so that a current on said secondary electrode side of said piezoelectric transformer is maintained at a constant level; and a driving frequency control circuit which controls a driving frequency of said switching element in such a manner that a phase difference between said alternating voltage applied to said primary electrode of said piezoelectric transformer and said alternating current supplied to said load is maintained at a constant value.

11. A piezoelectric transformer according to claim 10, wherein said voltage applied to said other of said primary electrodes of said piezoelectric transformer is located at a point intermediate of said coil and said switching element.

12. A piezoelectric transformer according to claim 10, wherein the phase difference between the alternating voltage applied to said primary electrode of said piezoelectric transformer and said alternating current flowing in said load is set at $90°±45°$.

13. A piezoelectric transformer according to claim 10, wherein the phase difference between the alternating voltage applied to said primary electrode of said piezoelectric transformer and said alternating current flowing in said load is set at $270°±45°$.

14. A piezoelectric transformer according to claim 10, wherein said driving voltage control circuit includes a switching element for switching the supply of said input power supply voltage to said boosting drive circuit on and off, and a circulation current retaining means, the switching frequency of said switching element being at least double said driving frequency of said boosting drive circuit.

15. A piezoelectric transformer according to claim 10, wherein said driving voltage control circuit includes a switching element for switching the supply of said input power supply voltage to said boosting drive circuit on and off, and a circuit which causing said switching element to be turned on and off intermittently at a period which is longer than that of said driving frequency of said boosting drive circuit.

16. A piezoelectric transformer according to claim 10, wherein said driving frequency control circuit includes a switching element for switching the supply of said input power supply voltage to said boosting drive circuit on and off, a coil located between said switching element and said boosting drive circuit, and a circulation current retaining means and a smoothing capacitor connected to respective opposite sides of said coil.

\* \* \* \* \*